US010394689B1

United States Patent
Ledet

(10) Patent No.: US 10,394,689 B1
(45) Date of Patent: Aug. 27, 2019

(54) COLLABORATIVE DATA SHARING AND DATA MODIFICATION APPLICATION

(71) Applicant: OPEN INVENTION NETWORK LLC, Durham, NC (US)

(72) Inventor: David Gerard Ledet, Allen, TX (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 230 days.

(21) Appl. No.: 15/181,637

(22) Filed: Jun. 14, 2016

(51) Int. Cl.
| | |
|---|---|
| G06F 11/36 | (2006.01) |
| G06F 9/44 | (2018.01) |
| G06F 17/30 | (2006.01) |
| G06F 8/30 | (2018.01) |
| G06Q 10/10 | (2012.01) |
| H04L 29/08 | (2006.01) |
| G06F 16/14 | (2019.01) |
| G06F 16/958 | (2019.01) |

(52) U.S. Cl.
CPC .......... *G06F 11/362* (2013.01); *G06F 8/30* (2013.01); *G06Q 10/103* (2013.01); *H04L 67/306* (2013.01); *G06F 11/3688* (2013.01); *G06F 16/148* (2019.01); *G06F 16/958* (2019.01); *H04L 67/125* (2013.01)

(58) Field of Classification Search
CPC .. G06F 7/78; G06F 8/00-78; G06F 9/44-455; G06F 11/36; G06F 17/30
See application file for complete search history.

(56) References Cited

U.S. PATENT DOCUMENTS

| | | | |
|---|---|---|---|
| 2003/0055660 A1* | 3/2003 | Gusler | G06Q 10/10 709/223 |
| 2005/0010376 A1* | 1/2005 | Bodin | H04L 67/125 702/188 |
| 2012/0159434 A1* | 6/2012 | Dang | G06F 8/36 717/120 |
| 2013/0007704 A1* | 1/2013 | Haynes | G06Q 10/00 717/120 |

(Continued)

OTHER PUBLICATIONS

Miryung Kim, An Exploratory Study of Awareness Interest about Software Modifications, May 21, 2011, [Retrieved on Mar. 28, 2019]. Retrieved from the internet: <URL: http://delivery.acm.org/10.1145/1990000/1984662/p80-kim.pdf?> 4 Pages (80-84) (Year: 2011).*

(Continued)

*Primary Examiner* — Anibal Rivera

(57) ABSTRACT

Sharing data with various user devices may offer an opportunity for various software testing and troubleshooting procedures to optimally process software code and provide testing results to those interested parties. In one example method of operation, a procedure provides receiving a modification to software code stored in a first file, identifying an oversight level of a user profile associated with a user device that performed the modification to the software code, creating a second file including the software code modification and an identifier identifying the modification, creating a number of notifications identifying the second file and the software code modification, and transmitting the notifications to a plurality of user devices having an oversight level that is greater than or equal to the oversight level of the user profile.

8 Claims, 33 Drawing Sheets

(56) References Cited

U.S. PATENT DOCUMENTS

| | | | | |
|---|---|---|---|---|
| 2013/0191394 A1* | 7/2013 | Bradley | ................ | G06Q 10/10 |
| | | | | 707/738 |
| 2014/0032573 A1* | 1/2014 | Etkin | ................... | G06F 16/958 |
| | | | | 707/751 |
| 2015/0205600 A1* | 7/2015 | Grillo | ................... | G06F 16/148 |
| | | | | 717/101 |
| 2016/0057651 A1* | 2/2016 | Backholm | ......... | H04W 28/0284 |
| | | | | 370/235 |
| 2016/0266896 A1* | 9/2016 | Fan | .......................... | G06F 8/73 |
| 2017/0075790 A1* | 3/2017 | Macleod | ............. | G06F 11/3664 |
| 2017/0123790 A1* | 5/2017 | Gupta | ................ | G06F 11/3604 |
| 2017/0123963 A1* | 5/2017 | Koren | ................. | G06F 11/3688 |
| 2017/0339596 A1* | 11/2017 | Backholm | ......... | H04W 28/0284 |

OTHER PUBLICATIONS

Ahu Sieg et al., Improving the Effectiveness of Collaborative Recommendation with Ontology-Based User Profiles, Sep. 26, 2010, [Retrieved on Mar. 28, 2019]. Retrieved from the internet: <URL: http://delivery.acm.org/10.1145/1870000/1869452/p39-sieg.pdf?> 8 Pages (39-46) (Year: 2010).*

* cited by examiner

| Role | Member | Email | Oversight Level |
|---|---|---|---|
| Co-Developer | Dale Evans | de@xyz.com | 1 |
| Co-Developer | Mary Cartright | mc@xyz.com | 1 |
| Manager | Bob Masso | bm@xyz.com | 2 |
| Senior Manager | John Duley | jd@xyz.com | 4 |
| Sales | Steve Goad | sg@xyz.com | 3 |
| Tester | Beth Morley | bm@xyz.com | 3 |
| Testing Manager | Dan Steele | ds@xyz.com | 3 |

FIG. 2

| Recipient: Dale Evans | Years Of Experience | Billing Scheme Bugs Created | Bugs Solved | Lines Of Code Submitted |
|---|---|---|---|---|
| Factor Values | 3 | 11 | 23 | 5570 |
| Calculation | 2 | 3 | 2 | 3 |
| Sum | | 10 | | |

FIG. 5

COLLABORATIVE DATA SHARING AND DATA MODIFICATION APPLICATION

TECHNICAL FIELD OF THE APPLICATION

This application relates to collaborative data sharing among peers and more particularly to data sharing and data updating among various users working together on a common project or work effort.

BACKGROUND OF THE APPLICATION

Conventional user access and network based collaboration on work related projects provide access, security updates and other features to the enterprise environment. One conventional application is offered by LIVELOOK as a provider of cloud-based, real-time visual collaboration with technology for co-browsing and screen sharing that optimizes customer interactions. For example, LIVELOOK's co-browsing technology enables customer service and sales agents to collaborate and visually guide consumers through web and mobile environments to resolve issues effectively and improve quality of buying decisions.

The ORACLE 'Service Cloud' and LIVELOOK empowers modern customer service organizations to directly engage with customers, bolstering customer satisfaction, agent efficiency, and revenue growth across web and mobile channels. The 'Service Cloud' is an integral part of the 'Customer Experience Cloud', which includes commerce, sales, service, social and marketing clouds, and enables a seamless and integrated customer experience. However, such approaches to customer support and integrated collaboration tools are limited in scope and do not offer a fully customized approach to user collaboration and engagement efforts.

In one specific example, in a software development and program coding environment, software development engineers often manage projects that can exceed thousands, and many times tens of thousands of lines of code. While it is impossible for one person to grasp all of the potential problems, or bugs, that may be created when altering the existing code, it is further difficult to ensure that a competent personnel member of the team or organization is validating the modified code. As software teams usually grow in proportion to the size of the code base, many times software engineers are forced to alter code that is outside their expertise. These modifications are due to the complex interactions between the various modules in the system. These code modifications are often the cause of previously unforeseen bugs that are hopefully detected before the software exits the design shop.

SUMMARY OF THE APPLICATION

One example embodiment may provide a method that includes at least one of processing software code stored in a first file, identifying a plurality of bugs in the software code, creating a second file comprising the software code and inserting identifiers at locations in the software code identifying the plurality of bugs, creating a plurality of notifications identifying the second file and the identifiers, and, transmitting the notifications to a plurality of user devices associated with the software code development.

Another example embodiment may include an apparatus that includes a processor configured to perform at least one of process software code stored in a first file, identify a plurality of bugs in the software code, create a second file comprising the software code and insert identifiers at locations in the software code to identify the plurality of bugs, create a plurality of notifications to identify the second file and the identifiers, and a transmitter configured to transmit the notifications to a plurality of user devices associated with the software code development.

Another example embodiment may include a non-transitory computer readable storage medium configured to store instructions that when executed causes a processor to perform at least one of processing software code stored in a first file, identifying a plurality of bugs in the software code, creating a second file comprising the software code and inserting identifiers at locations in the software code identifying the plurality of bugs, creating a plurality of notifications identifying the second file and the identifiers, and transmitting the notifications to a plurality of user devices associated with the software code development.

Another example method of operation may include a method that includes at least one of receiving a modification to software code stored in a first file, identifying an oversight level of a user profile associated with a user device that performed the modification to the software code, creating a second file comprising the software code modification and an identifier identifying the modification, creating a plurality of notifications identifying the second file and the software code modification, and transmitting the notifications to a plurality of user devices having an oversight level that is greater than or equal to the oversight level of the user profile.

Another example embodiment may include an apparatus that includes a receiver configured to receive a modification to software code stored in a first file, a processor configured to perform at least one of identify an oversight level of a user profile associated with a user device that performed the modification to the software code, create a second file including the software code modification and an identifier to identify the modification, create a plurality of notifications to identify the second file and the software code modification, and a transmitter configured to transmit the notifications to a plurality of user devices having an oversight level that is greater than or equal to the oversight level of the user profile.

Another example embodiment may include a non-transitory computer readable medium configured to store instructions that when executed causes a processor to perform at least one of receiving a modification to software code stored in a first file, identifying an oversight level of a user profile associated with a user device that performed the modification to the software code, creating a second file comprising the software code modification and an identifier identifying the modification, creating a plurality of notifications identifying the second file and the software code modification, and transmitting the notifications to a plurality of user devices having an oversight level that is greater than or equal to the oversight level of the user profile.

BRIEF DESCRIPTION OF THE DRAWINGS

FIG. 2 illustrates a table of entity personnel with corresponding oversight levels according to an example embodiment of the present application.

FIG. 5 illustrates a table of code error and factor values according to an example embodiment of the present application.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Figure 1:
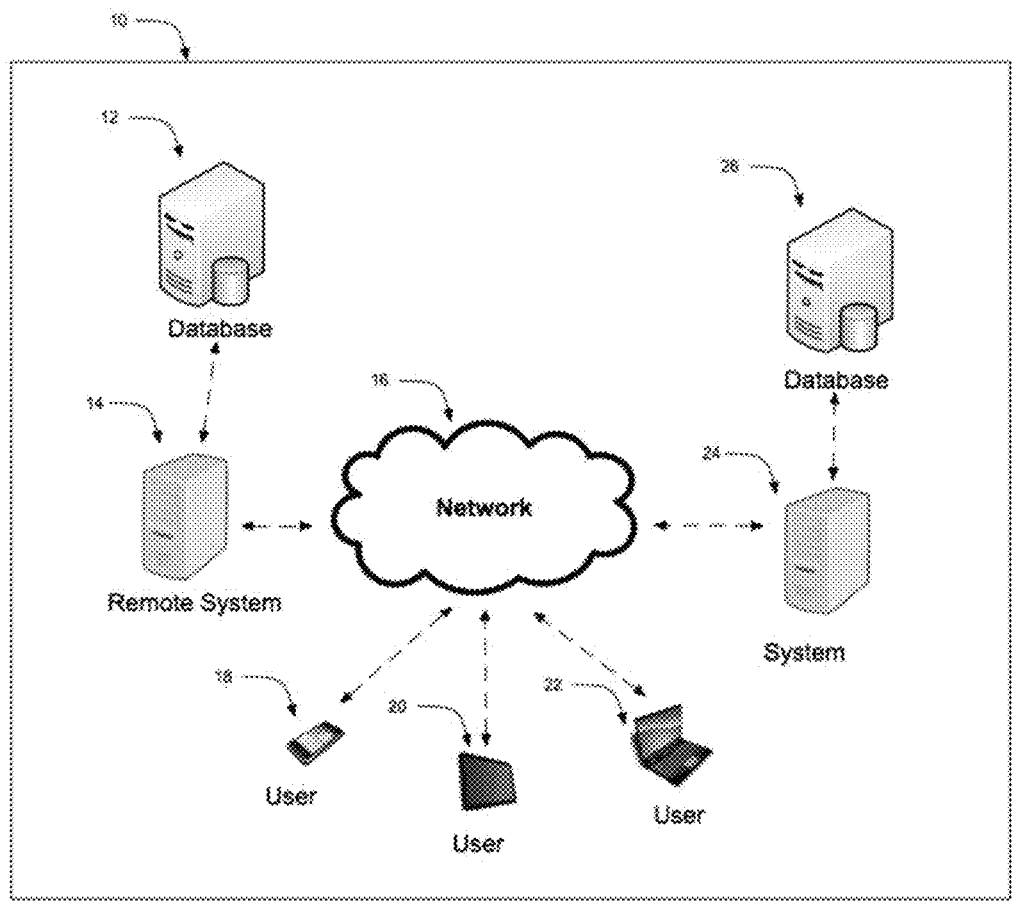
FIG. 1 illustrates a system diagram according to an example embodiment of the present application.

FIG. 1 illustrates a system network diagram according to an example embodiment of the present application. Referring to FIG. 1, the network diagram 10 of the present application may permit a user utilizing a mobile client machine 18, a tablet computer 20, a laptop or desktop computer 22 to download data and application data from the system server 24 over the network 16. The client's device may also be a gaming device, a DVD player, or any other device that is normally used to access media.

The computing device 18/20/22 is connected to the network 16, which may be the Internet or any other type of communication network through wired or wireless communication. It should be noted that other types of devices, in addition to devices 18/20/22, might be used with the example embodiments of the present application. For example, a PDA device, an MP3 player device and/or any other wireless device including a gaming device, such as a hand-held device or home-based device and the like including a P.C. or other wired device that can also transmit and receive information could be used with the embodiments of the present application.

The user of the application can interface with the client device 18/20/22 and connect through the network 16 to the system server 24. The system server 24 can be redundant or may be more than a single entity without deviating from the scope of the application. A database or database server 26 may be directly connected to the system 24 or connected remotely through the network 16 without deviating from the scope of the application.

In operation, a remote system server 14 communicates with the network 16. The remote system 14 can be redundant and/or may be more than a single entity device without deviating from the scope of the application. A database 12 is directly connected to the remote system server 14 or may be connected remotely through the network 16 without deviating from the scope of the application. The user-database can reside in the system server 24 or the database 26 either directly connected to the system 24 or remotely through the network 16.

The application of the current application resides completely or partially on the user's device 18/20/22, which can be a mobile device, but can also reside on a user's desktop computer, a personal digital assistant (PDA), tablet computer, a smart watch or smart eyeglass worn on the body of the user or any other device containing a processor, memory, and an operating system. In addition, the software application of the current application can reside on either completely or partially on any one of the other elements in the system 10 depicted in FIG. 1, for example, the system server 24, the database server 26, the remote system server 14, the database server 12, and/or the network 16. If the software application of the current application resides on a device, the application may be downloaded through a platform, such as an application store or virtual market residing on the device or accessed via the device, or may be accessed through the device's browser communicably coupled to the network 16. Further, the application of the current application can be pre-loaded on the device.

There are many types of data that can be shared, i.e. text, images, videos, photos, multimedia files, URLs/links, etc. The current application discloses examples of sharing modified data or data to be modified. A specific type of data referred to throughout this disclosure is software code data. This application will discuss software code as a practical example, however any type of data may be used for collaboration, modification and other data operational examples enclosed throughout the application.

According to example embodiments, screen sharing between two or more computing devices has various practical applications. In one example, screen sharing enables remote technical support. Another practical use of sharing data is collaboration between a host and a viewer so the host may give a presentation to one or more remote viewers, perform demonstrations, review documents, and share images. Such applications are useful in remote classroom scenarios such that a presentation may be performed and shared across a network when the student is remotely located with respect to the teacher.

Within the realm of software development, in order to overcome the appearance of software errors or 'bugs', larger systems often perform a regression-testing process where the system is operated through a series of test cases in an automated manner. This regression test attempts to execute most, if not all, of the lines of code assuring that any submitted code modifications have not broken seemingly unrelated areas in the system architecture. While the regression testing uncovers bugs in the system, it does not determine the correctness of the code modifications. The software engineer may submit code modifications that are bug-free, but do not follow acceptable coding standards nor solve the problem by the standards of the software company or team supporting the effort. While regression testing is one of the more reliable methods used to uncover bugs, a more appropriate process may permit qualified personnel to assess the code modifications such that comments and critiques are made to solidify the effort.

According to example embodiments, a process to assess code modifications such that a more reliable validation of the code modification is obtained would optimize the assessment and troubleshooting efforts of the team. This validation of the modifications will assure that the system changes are provided in a reasonable timeframe, and peripheral code is not adversely affected by the code modification. The current software application permits for the sharing and/or notification of modifications to data, such as a code base, such that recipient(s) of the share/notification are those that the software determines to be either interested in the modification, or necessary depending on the type of modification presented. Embodiments included herein expand functionality of the present application and offer examples depicting the functionality of the application. The embodiments and examples serve to describe the overall functionality of the application. The application may perform actions that permit an organization's most appropriate personnel to be involved in consequential decisions by permitting them a window of opportunity for input into those decisions. For example, FIG. 2 illustrates a table 200 that identifies personnel by a user profile and name. The role, member name and email are all commonplace titles assigned to personnel, however, the oversight level may provide a degree of weight each engineer is assigned when the application operates and attempts to receive feedback regarding modifications to the software code. For instance, table 1 provides an example of the mappings of the personnel to their assigned oversight level. This information may be obtained from the organization's resource data and compiled per project or assignment. For example, the application interacts with the organization's human resource data, technical data, or other similar database(s) through an application program interface (APIs), for example, when queries of employee data return specifics surrounding project personnel, organization hierarchy, and the like. Depending upon the role and current position of the member, a level is pre-assigned to that individual to guide subsequent communication and input authorization determinations. The levels may be derived from corporate status, manager assignment and/or other standard setting procedures. Information may also be included for additional interaction with the personnel, such as phone numbers, cell numbers, geographic location of their work location, etc. The column entitled "Oversight Level" indicates a notification level based on position within the organization and/or the management impact of the proposed change and the visibility to customers of a proposed change. For instance, the modifications to the code made by a higher level oversight assigned member may be unchangeable by others with lesser levels and may be visible to pre-assigned members while other modifications may have a limited visibility and impact.

Figure 3:
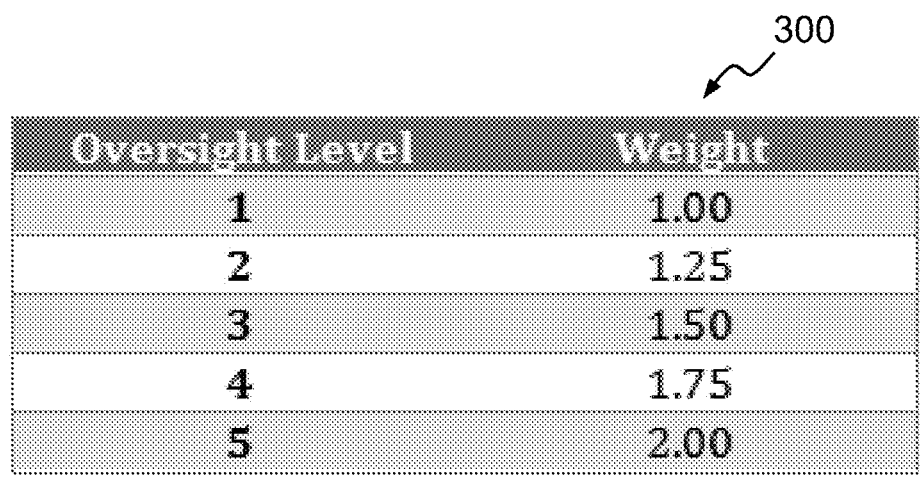
FIG. 3 illustrates a table of oversight levels and corresponding weights according to an example embodiment of the present application.

In another example, the feedback weight of a person who is a level 4 or 5 (on a 5 point scale) may be considered more important than the feedback weight of a person who is a level 1. In calculating votes of the recipients the feedback weight is utilized. FIG. 3 illustrates an example weight structure table 300 which illustrates progressively more weight to the higher-level oversight assignments. In another example, the application determines the primary architects on a project-by-project basis. This data may be obtained by interfacing with the project data, for example, data in project managing software. These primary architects (level 3 or higher) are informed of alterations in the code pertaining to the project since they are the primary architects. The alterations in the code may be stored temporarily and may cause a trigger to be performed that initiates a variety of notifications to all personnel having a threshold level of oversight, and may create permission requirements pending a decision prior to the modifications being enacted permanently.

In another example, other personnel are notified of software changes and comments, etc., however the notifications do not detail the specific code changes, but depict the overall comments related to the altered code. Many personnel (for example managers, senior managers, marketing and sales personnel, etc.) may not understand the details of the code but may understand comments related to changes made to the code. The notifications permit those personnel to be kept abreast of changes without having to view the details of the code changes.

In another example, the level of a personnel profile is not based solely on his/her position in the organization, but on other factors. One of these factors may be the area of software that is currently being examined. For instance, the more sensitive projects may limit personnel exposure by only permitting certain levels of personnel to access the project. Other factors that may be considered are experience, previous problem creation, previous success in problem resolution, overall breadth in coding experience determined by lines of submitted code, problem similarity to previously resolved issues, previous success in problem prevention, conciseness of previous solutions and thoroughness of previous solutions. All those factors may be quantified by a numerical quality measure and/or numerical experience measure.

Figure 4:
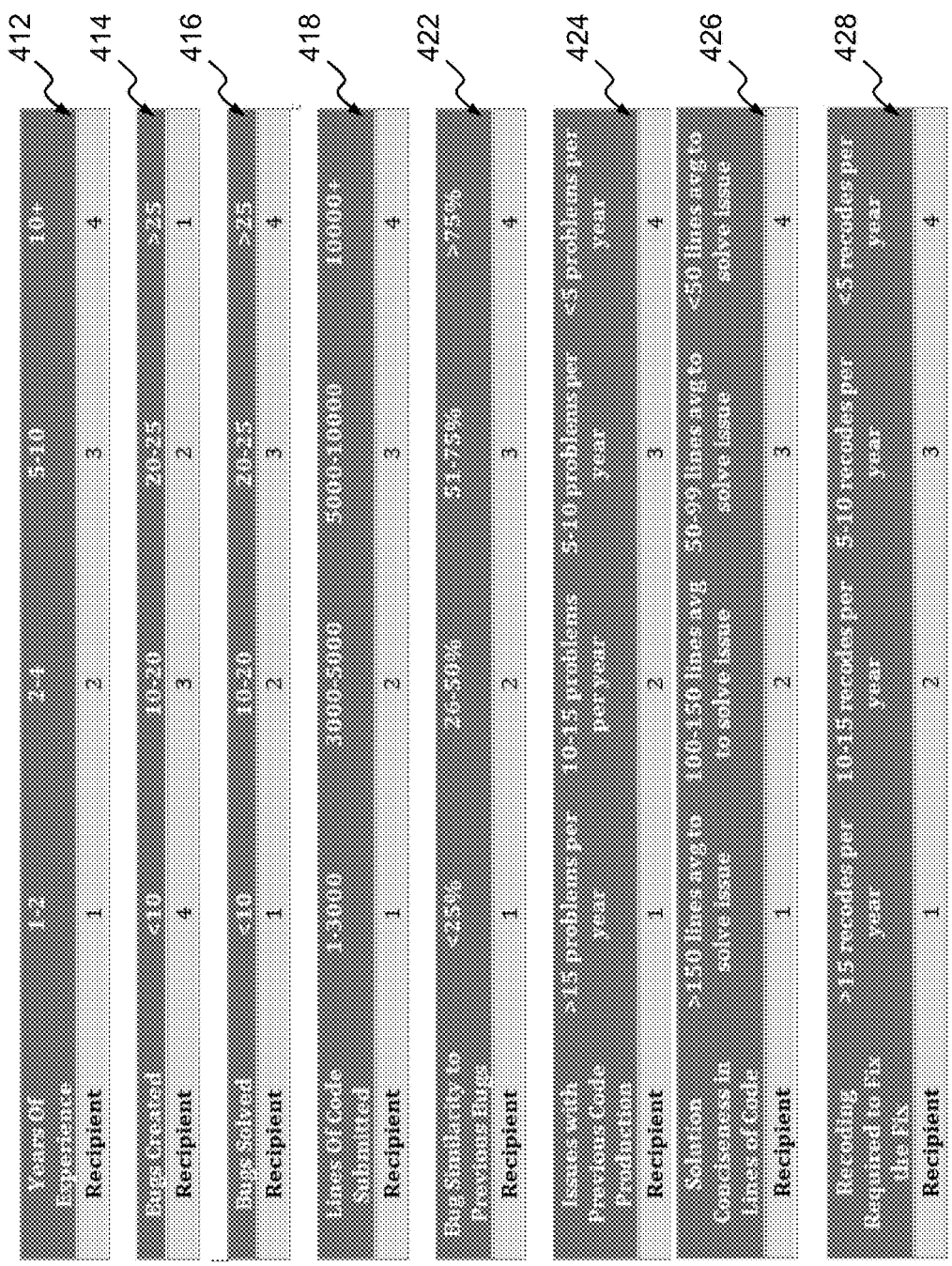
FIG. 4 illustrates a table of various personnel factors according to an example embodiment of the present application.

FIG. 4 illustrates a table of quality measure examples per user/recipient. Referring to FIG. 4, the recipient may be any member of the personnel team. Among the personnel specific factors or variables are 'Years Of Experience' 412, 'Bugs Created' 414, 'Bugs Solved' 416, 'Lines Of Code Submitted' 418, bug similarity to previous bugs 422, bug similarity to recent bugs resolved (not shown), issues with previous code production 424, solution conciseness in lines of code 426, recoding required to fix bug 428, etc.

In this example of FIG. 4, each of the classifications for the various values or variables may be ranked from 1-4. The number of rank positions may be 3, 4, 5, more, however, in this example, 4 positions are used. The various topics may include one class ranking per user. The total number of topics (8) may then be averaged to identify one overall user or recipient score. For example, if a user has four "4"s and four "2"s then the overall score for the recipient may be "3" out of a possible overall score of 4. However, individual scores for a particular topic may also be important as a particular bug may be identified and denoted as requiring a level 4 recipient in the category of solution conciseness, especially if the project completion date is nearing. The time sensitivity may cause an urgency upgrade for recipients with a history of swift conciseness and fewer lines of code required. Therefore, if a project calendar date threshold is nearing (i.e., 10 days or less until delivery), then the urgency and requirements for personnel may change to more stringent standards (i.e., level 2s and is are no longer eligible for correction and comments). Each of the above tables helps the software determine the level of the recipient and is based on the software module of the code under determination.

An example perfect score of 16 indicates that the person's profile is ascertained to be listed among the highest level expert of developers in that particular software area. Accordingly, scoring determines the factor of expertise that the recipient brings to the critique of the software. To determine the factor of the recipient, for example, the following calculation may be used with reference to FIG. 5. For instance, in billing software, a recipient: 'Dale Evans' may have 3 years of experience with 11 bugs created, 23 bugs solved and 5570 lines of code. The values corresponding to those numbers include 2, 3, 3 and 3, respectively. The sum of the values is 10 and this number is used as the rating for this user profile. Using the calculation in the table 590 of FIG. 5, it is surmised that Dale has a rating of 10. Therefore, in the billing area, he is considered somewhat of an expert since the maximum score is 16 and few individuals are likely to have such a high score. Using those factors, it is possible to quantify and compare the critique and voting of the recipients.

The application may automatically initiate a code compile operation, a share operation with at least one other user that may be a peer, a manager, project manager, or any other entity that may be interested or impacted by the identified bug, proposed change, etc. The sharing of the data may be performed by the software automatically or manually as initiated by the user. Sharing the proposed change may be initiated when an impact level is reached in which others would be interested in or impacted by a proposed change. The automatic initiation of sharing is determined by metrics that are either static in nature, meaning that the metrics are hard-coded into the software, or dynamically determined by the user in a configuration portion of the software. These metrics may include such elements as: the number of lines of code changed, a type of code that has been changed (i.e., a comment line, a line with a data structure, a data structure variable and/or class/object element, a data structure that is predetermined to be one that is a critical or base data structure, etc.), an alteration to an element in the code has been made, such as modifications to a class in the program, or a class variable or class method, an alteration to a system-level method affecting many different modules, or an alteration to the code that effects a pre-determined critical class has been made, or an alteration to any other element in the code has been made so the organization may desire to raise awareness based on the organizations business requirements, which may include specific modules containing critical-level functionality and/or code that, through its wide impact on other elements, require full regression when implemented.

In one example, when the user is altering only comments in code, this is of low interest to others and the changes may not be shared with other users. The specific area of the change may also be important in determining the need to share. For example, if the change is made in the billing area, the need to share the change is greater than if the user were making changes in the area of log entries.

There are various ways to categorize software and the categorization may reflect the nature of the organization as well as the business requirements of the organization. This application offers various approaches that may be utilized to rank the areas of software in an organization. Various operations detailed in the application serve to offer high-level examples by which software may be ranked.

Figure 6:
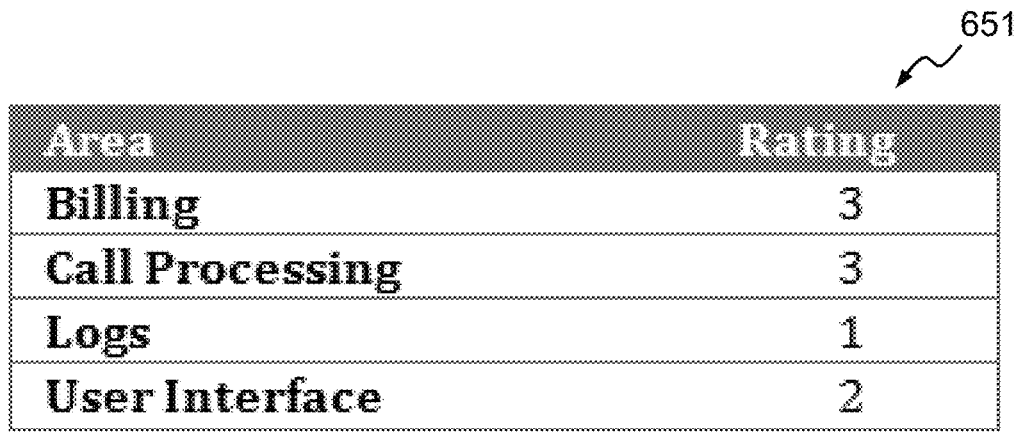
FIG. 6 illustrates a table of development areas according to an example embodiment of the present application.

FIG. 6 illustrates a table 651 with various areas of an organization and a rating required to assist in those areas via the software personnel. The column entitled "Rating" indicates areas of importance from a business interaction perspective, which may be impacted by the proposed change. As such, areas that are altered with a higher rating would indicate that changes to the code in that particular area are more financially critical or sensitive and thus need to be verified in greater detail by personnel before the proposed change is accepted. For example, the rating of software areas may be included in the documentation of the code, otherwise known as technical documentation. Technical documentation is documentation embedded in the source code. Certain operations may be used to auto-generate the code documents by extracting the comments and software contracts, where available, from the source code and creating a reference manual automatically in such forms as text or HTML files. As the rating of areas of the software are included in the comments, the current application may be able to ascertain the rating of the software area by accessing the rating of the edited code in the auto-generated reference manual of the code. Ranking the type of modification is necessary to understand the nature of the change to the code. Modifications of comments only do not need further review, but modifications to data structures are critical and may warrant further review.

Figure 7:
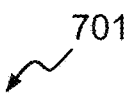
FIG. 7 illustrates a table of code modification types according to an example embodiment of the present application.

FIG. 7 illustrates a code modification type table 701. Examples include types of code modifications made by the user and the respective ranking of the types of changes. The column entitled "Ranking" indicates the rank of the area such that a higher rank indicates greater importance, and a lower rank indicates lesser importance. As such, modifications reflecting a higher rank may indicate that those modifications are more critical and would warrant additional review before the changes were accepted and the work order can be finalized.

Further classifications of code modifications may be determined and similarly ranked. For example, a list of modifications to these data structures is automatically flagged for review. These data structures may be structures that span many aspects of the code base, or data structures that pertain to critical parts of the code base such that changes to these critical portions automatically warrant further review.

Figure 8:
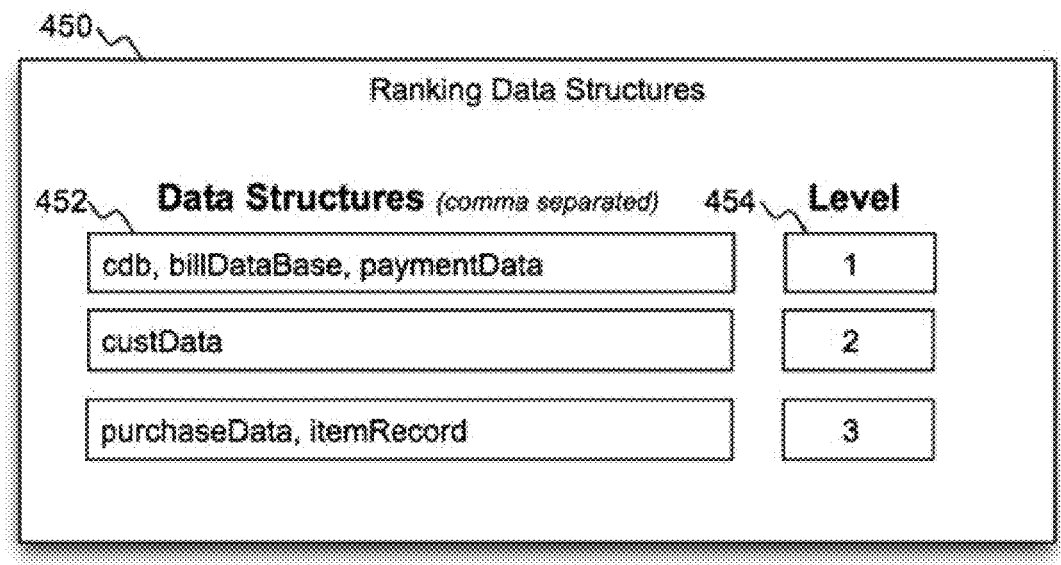
FIG. 8 illustrates a user interface of ranking data structures according to an example embodiment of the present application.

FIG. 8 is a graphical user interface (GUI) screen 450 depicting one example of the current application illustrating a ranking of particular data structures in a code base. The user is able to provide a ranking of specific data structures in the code base. A text entry component 452 permits the user to enter data structures (comma delimited in this example) pertaining to a particular level. In another embodiment, the text area automatically expands to permit multiple lines of entry. Another text entry component permits the user to enter in a value that assigns the entered value to the data structures. The software compares the modified code with the data structures entered into the ranking data structures window and records the associated level to the code modification.

According to another example, a ranking of modules and procedures may be utilized to determine a need for peer review prior to submission of the proposed change to the code. This ranking may be placed within the code as part of the coding process so each of the procedures/modules within the code are documented to reflect the "rank" of the procedure/module. A proposed change to a procedure/module assigned to a lower ranking would be considered a less critical change and a ranking with a higher level may be considered a more critical change that would require review by a qualified user prior to submission. For example, the rank of each procedure/module may be included in the documentation of the code, also referred to as technical documentation.

Technical documentation is documentation embedded in source code. Often, tools may be used to auto-generate the code documents by extracting the comments and software contracts, when available, from the source code and create reference manuals in such forms as text or HTML files. As the rank of each of the procedures/modules is included in the comments, the current application is able to ascertain the rank of the edited code by accessing the rank of the edited code in the auto-generated reference manual of the code.

The timetable of a proposed code change to a software release may also be a factor in determining the need for a review (e.g., 21 days, 21-15 days, 14-8 days, 7-5 days, less than 5 days). If the code change is at the beginning of the coding cycle (i.e., 21 days or more) there exists less of a need for a review of the change. If the change is made when the product is close to being released (i.e., less than 5 days), then an elevate need exists to have the code reviewed. As the time of the proposed change moves closer to the release date, the current application determines the amount of time until delivery and uses this information as an additional item in determining whether a review of the code is required.

Figure 9:
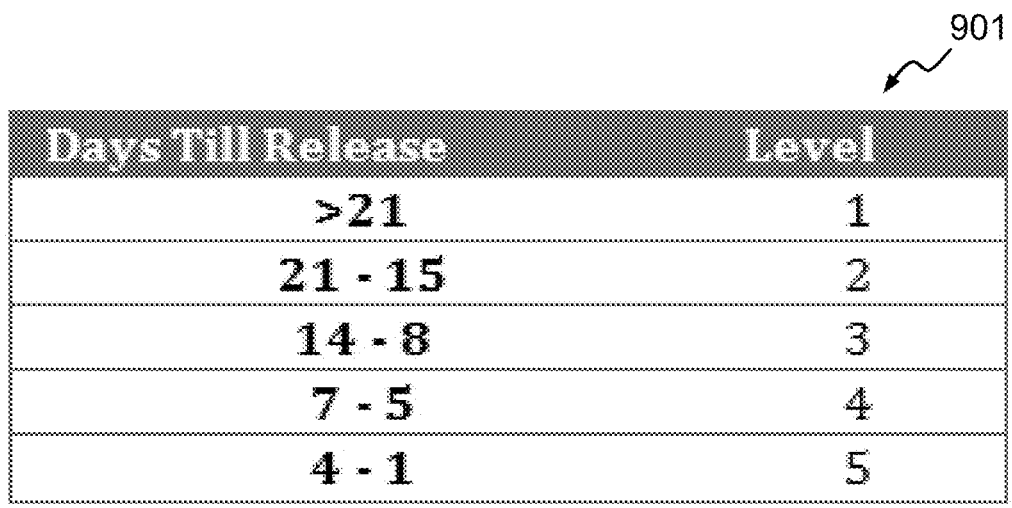
FIG. 9 illustrates a table of time period levels according to an example embodiment of the present application.

FIG. 9 illustrates a possible implementation of the current application including a possible mapping of the number of days until release of the software with respective levels for each of the time periods. As the release date nears, all modifications to the code become more critical, and thus require more scrutiny. The current application takes into account the number of days until the release of the software in determining the need of the code to be reviewed.

Referring to FIG. 9, in the table 901, the column entitled "Level" reflects a number that the software uses to determine the amount of time until release of the developing software. A higher number reflects a more critical time period, and a lower level reflects a longer time until release of the software. Screen sharing may be used as well by sending a notification including the changes made to the module(s) or sending a notification to recipient(s) indicating a desire to share a screen to review modifications, and initiating a screen share with recipient(s). One example of sharing may include the sending of the code differences between two files where one file contains the altered code and the second file contains the original code. These changes are then sent to the recipient(s) devices wherein a 'Modified Code Notification' window is displayed on the recipient(s)' devices. The one file may be the code version and may be stored in a temporary status that is not active and is not part of the master code files. The second file may be the actual code until the code is changed and approved at which time the first file may be merged with the second file or may take the place of the second file as a new master code file.

Another way to share the code changes includes sending a notification to the recipient(s) such that the notification indicates the desire for the originator of the code modification to establish a screen sharing activity with the recipient(s). The recipient(s) may accept or deny the screen-share request via interacting with components on the GUI of the notification window. Another way for sharing includes the direct sharing of the user's screen with the recipient(s). The screen data is delivered to the recipient(s) such that the recipients may accept or deny the request. For example, User A modifies an area of code in a development environment and the portion of the changed code is send to User B as a peer, or someone that is able to provide additional input and/or review of the modified code. The notification may be sent either automatically or through interaction with the GUI, and the user may initiate the sending of the change.

Figure 10:
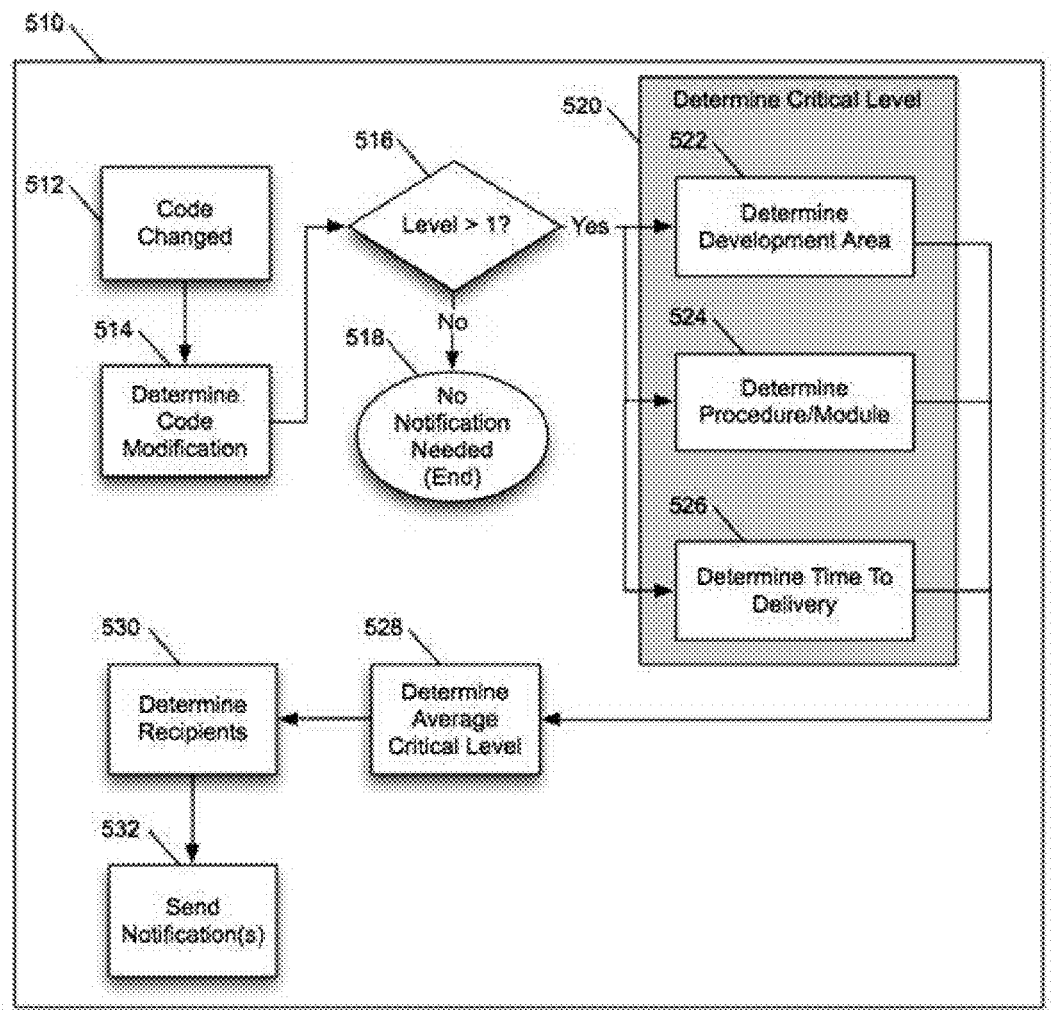
FIG. 10 illustrates a logic flow diagram of determining notification recipients according to an example embodiment of the present application.

FIG. 10 is a logic implementation of the current application used to determine the nature of the changed code, and determine the recipients of a notification 510. In operation, the user alters the code 512 by adding code, deleting code or moving code and the modification to the code permits for the functionality to be executed that determines various aspects of the altered code. A first check may be made to determine the type of code modification 514. Some of the possible types of modifications are an alteration to the comments in the code, an alteration to the GUI, an alteration to the logic in the code, and/or an alteration to data structure(s) in the code. The various levels pertaining to the change may be determined at this point. If various different types of changes are being made, then the highest level of change of the various levels may be utilized in the determination. Other types of alterations are possible and list may be made to serve as an example of the types of changes that may be made such that other types of modifications may be listed without deviating from the scope of the application.

If the level of the change does not exceed level-1 (a comment alteration) 516, no notification may be necessary 518 and the process ends. If the level is above level-1, then a notification may be necessary and processing continues to further determine the critical level of the code modification 520. The type of change may be determined by understanding the area of the code that is being modified 522, the procedure and/or module that is being modified 524, and the current time to release of the code being modified 526. These calculations arrive at a singular "critical level" in each of the determinations.

The area of the code being modified is determined 522 by the generated documentation from the software system where the ranking of each of the software areas were previously inserted into the comments of the code. For example, if the modified code was in an area contained in the billing software area, the representative level for that software is assigned a number, for example "3". This ranking may be used in the current calculation. In another example, if more than one area is being modified in the software modification, the highest level of the proposed change area is utilized. The level of the procedure/module where the code is being modified is determined 524 by the generated documentation from the software system where the ranking of each of the procedures/modules was previously inserted into the comments of the code. This ranking may be used in the current calculation. In another embodiment, if more than one level of the procedures/modules was modified in the software modification, the highest level of the ranked procedure module is utilized.

The time to release 526 the modified software may be calculated where a level or a number is assigned to the determination procedure. Once the critical level of each of the calculations is determined, an average of the critical levels is calculated resulting in a single number reflecting the critical nature of the code modification 528. In another example, the highest critical level is used as the critical level of the code modification. Also, at least one critical level may be made a higher priority, thus when calculating the single critical level, more weight is placed on the level(s) that has the higher priority. The recipients are determined and are sent the notification(s) of the code modification 530. In determining the recipient(s), the application uses the critical level that has been calculated. For example, if the critical level is a 4, all of the recipients that are at a level 4 and below are notified of the code modification. In another example, at least one critical level is made a higher priority, and thus when determining the recipient(s) of the notification, more weight is placed on the level(s) that has the higher priority. The notification(s) is/are sent to the determined recipient(s) 532.

Figure 11:
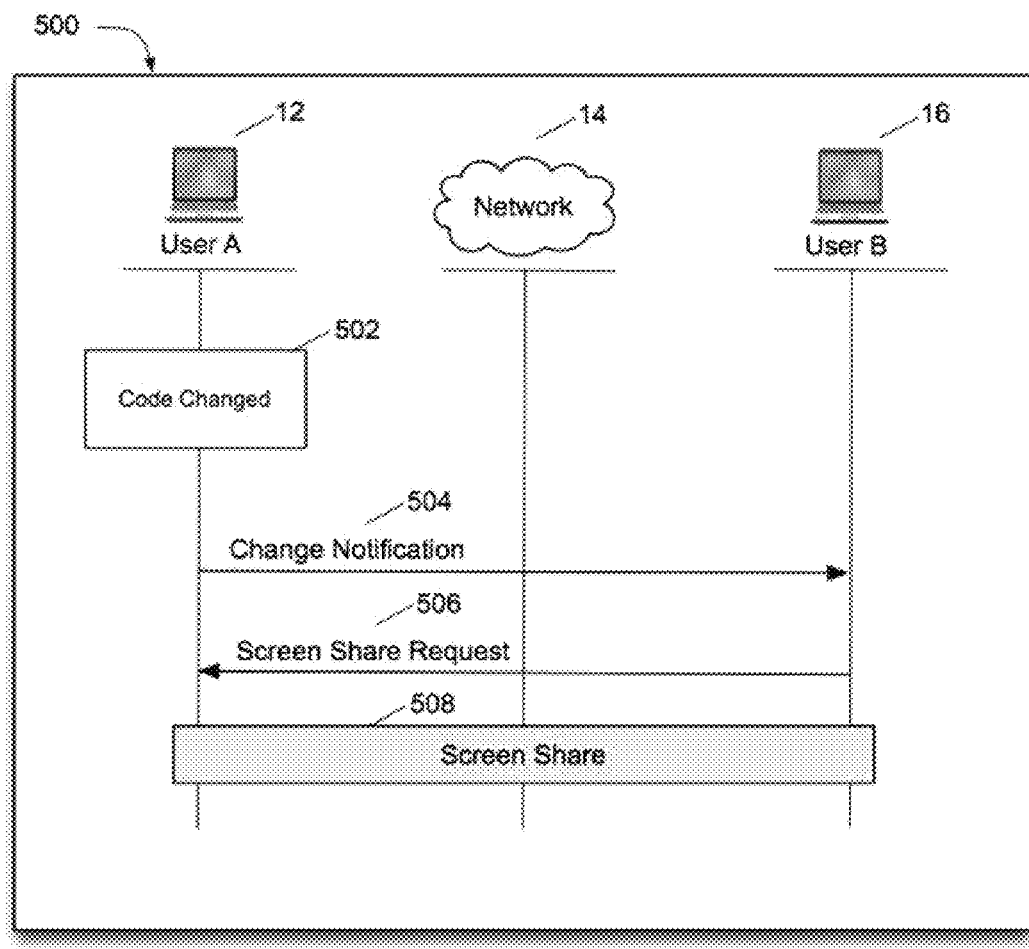
FIG. 11 illustrates system message flow code change notification diagram according to an example embodiment of the present application.

FIG. 11 is a message flow in one possible implementation of the current application 500. Referring to FIG. 11, User A 12 alters the code such that a change notification message 502 is created and sent to User B. The message is created responsive to the code modification/alteration 502 and includes comments, a highlighted portion of the altered code and a link to the temporary modified file so user B can view those changes. The message is then routed through the network 14. This message contains data of the change in the code. This data contains the at least one temporary file that has been altered along with the user's name and any other data such as contact information, etc. User B 16 receives the notification 504 and may view the change. The user B 16 may desire to initiate a screen share, which interacts with a component on the notification window that initiates the sending of a screen share request message 506 to User A. This message is routed through the Network 14 and a screen share 508 is established between User A and User B.

Figure 12:
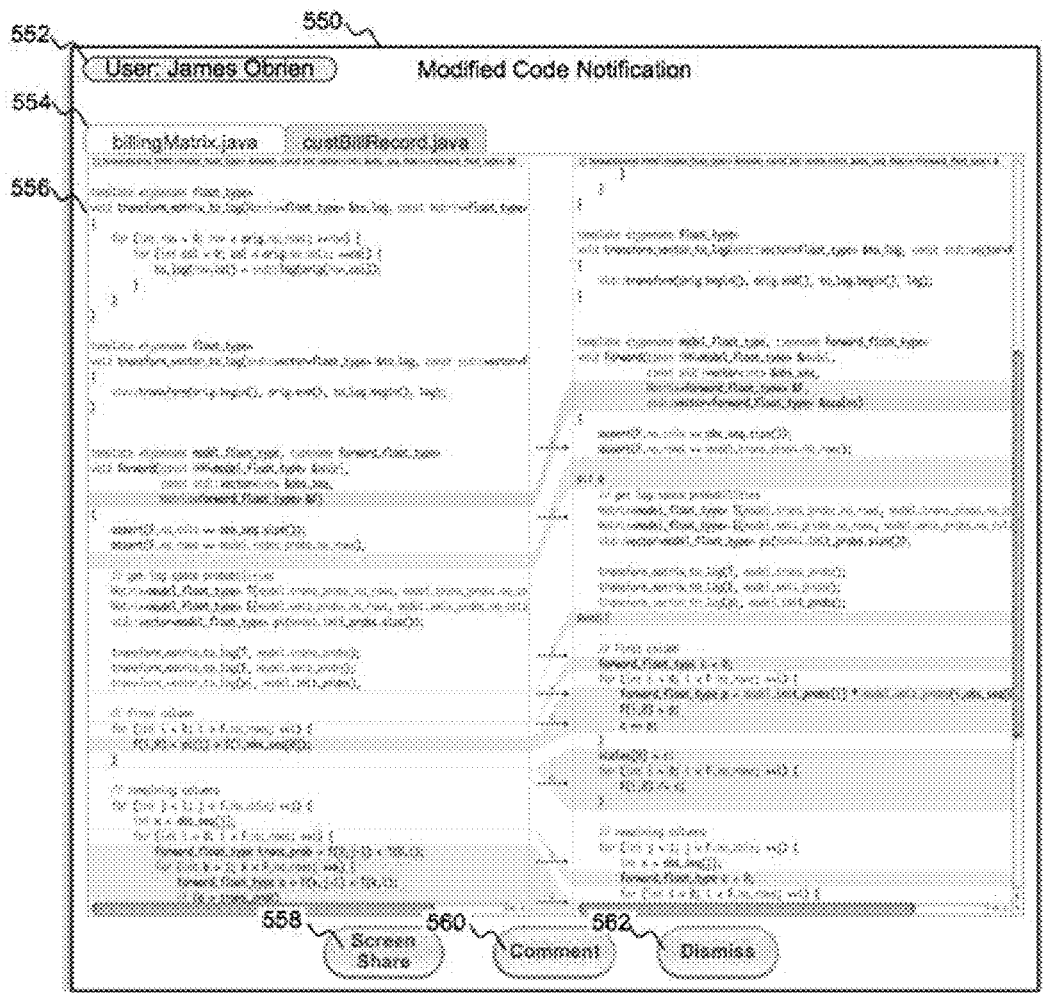
FIG. 12 illustrates an example modified code notification according to an example embodiment of the present application.

FIG. 12 is a possible implementation of a notification displayed in a user interface 550 depicting a change to code that is presented to recipient(s) according to example embodiments. The notification presents changes made to the code in a notification permitting the user to interact further with the user of the proposed changes. The user initiating the change 552 may be displayed at the top of the notification window. This permits the recipient(s) to know who is proposing the code change. A tabbed component 554 exists in the scenario where more than a single file has been altered. The tabbed component permits the reader to navigate through all of the altered files.

The code difference 556 may be displayed in the notification window. The code difference may be determined by products that are widely available that compare two versions of a file including the modified temporary file and the original unmodified and permanent file. The window permits the reader to determine that the code has been changed through altering the background of the code. Furthermore, the reader may be able to scroll through the file by at least one scroll bar permitting the reader to navigate up/down as well as left/right. The name and location of the code in the changed file may be located at the top of the code portion of the notification permitting the reader to determine the file and hierarchy of the proposed change. The reader(s) may be able to view and understand the proposed change, also buttons are presented at the bottom of the notification user interface to permit the reader to further act on the proposed code change. A "Screen Share" button 558 may permit the reader to initiate a process that sends a notification to the user so the user is able to share a screen with the reader(s) permitting further interactions. A "Comment" button 560 permits a separate window to be displayed and the user may be able to traverse through the code modifications and provide comments to the user such that the comments are aligned with the code modification. A "Dismiss" button 562 dismisses the notification window removing the notification window from the display without taking any further action.

Figure 13:
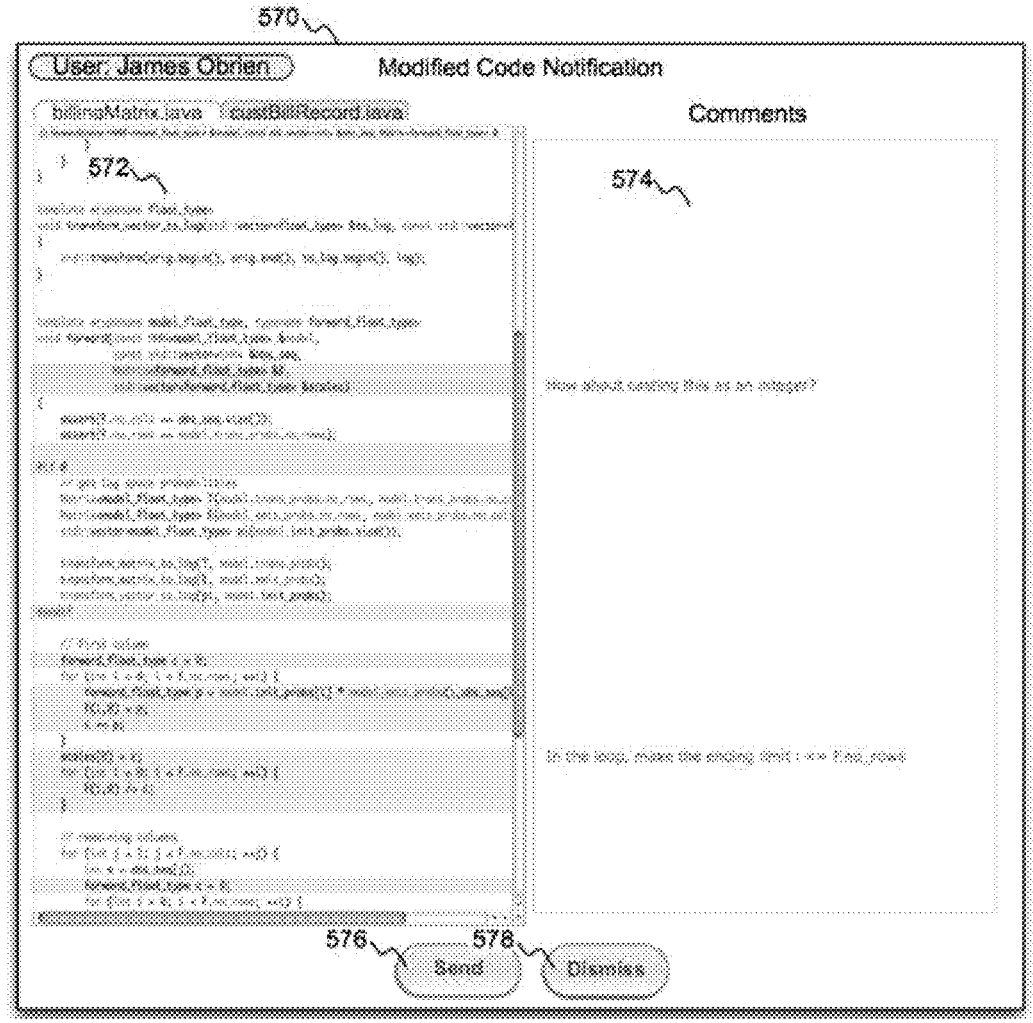
FIG. 13 illustrates a modified code notification with comments according to an example embodiment of the present application.

FIG. 13 illustrates a notification user interface 570 depicting a change to code that is presented to a recipient further permitting the reader to enter comments. The modified code is listed on the left hand side 572 and the highlighted portions indicate the altered code. A comments area 574 may be present so the user is able to enter comments aligned with the portion of code pertaining to the inserted comments. The user may select a portion of the comment area and begin to type a comment. The comment may be placed in the area where the user clicked. In another example, the user may be able to move the comment around the comment area, further permitting the alignment of the comment with the modified code on the left area. A "Send" button 576 permits the comments to the delivered to the user and a "Dismiss" button 578 removes the window and no further action is performed. In another example, the difference in the original code and the modified code is shown in the 'Modified Code Notification' with the comments window 570 along with the area to enter comments. This permits the reader to view the entire code modifications and enter comments on the same display area of the display device.

In another example, the reader of the comments and code may interact with the components on the window to insert comments of their own. For example, when the user clicks on a portion of the code modification window 550 of FIG. 12, a pop-up component may be displayed such that the reader may enter a comment. The pop-up component may be moveable permitting the reader to move the comment exactly where the comment references the portion of code to which it pertains. These pop-up comment components may be delivered to the user when the reader has completed the interaction with the 'Modified Code Notification' window 550.

Figure 14:
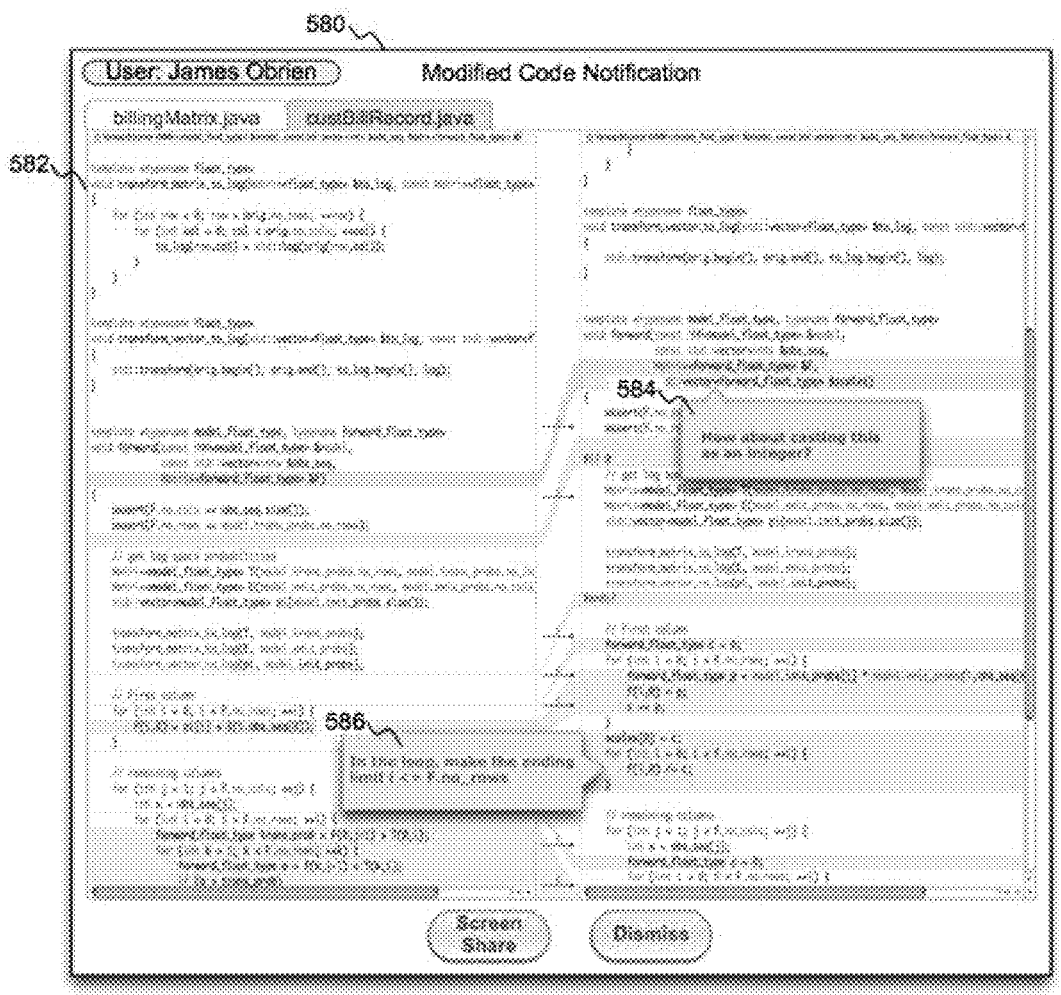
FIG. 14 illustrates another modified code notification with comments according to an example embodiment of the present application.

FIG. 14 is a possible implementation of a notification depicting a change to code that is presented to a recipient further permitting the reader to enter comments in pop-up comment components 580. The code modification change 582 displays the original and altered file, along with highlighted areas indicating the modifications made to the original file. In operation, the user selects a the portion, or double clicks, or combines a key press with a click, or any other similar interaction so the functionality is executed to enter a pop-up comment window 584 over the displayed code portion of the 'Modified Code Notification' window. Once the user has entered the comment in the pop-up comment window 584, it may be moved by click/dragging the window around the display and releasing to drop the component. The user may be able to direct the comment exactly over the portion of the code pertaining to the comment. The raised portion on the pop-up comment window may be moved around the comment window by clicking and dragging the raised portion permitting the user to point to the precise code pertaining to the comment 586.

In another example, a screen sharing may occur automatically when the system determines that a file alteration warrants a review by another person. In such a scenario, the application automatically sends a notification to recipient(s) of a change that is in need of review. The application sends automatic notifications according to at least one of a minimum number of lines that are altered as either predetermined by the application or as configured in the configuration area of the application via the user.

Figure 15:
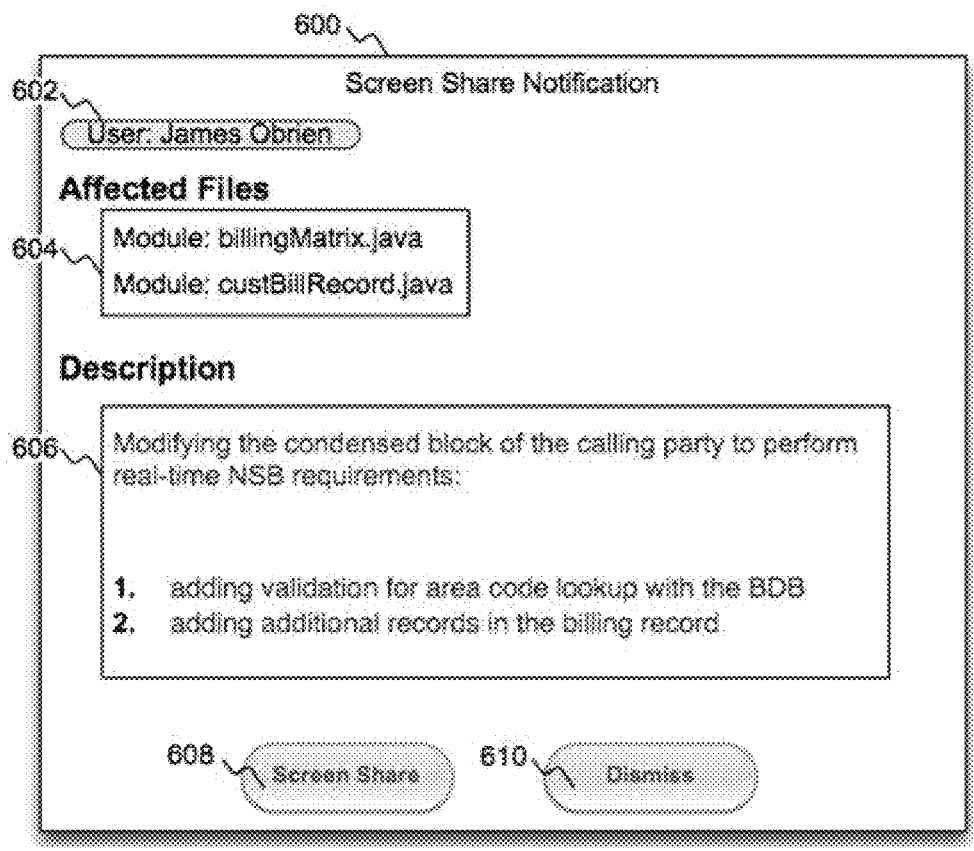
FIG. 15 illustrates a notification screen share user interface according to an example embodiment of the present application.

FIG. 15 illustrates a GUI snapshot of a screen share notification in one possible implementation of the application 600. The snapshot illustrates a 'Screen Share Notification' window that is sent to recipient(s) as determined by the application. In an additional example, the user has the option to initiate the screen sharing via a component on the display of the device. A component is displayed on the GUI such as a button entitled "Screen Share". When the button is pressed, the functionality that sends a notification to recipient(s) is executed. In another example, additional functionality may be included when the user 602 presses the button to share 608. The functionality may be added to a procedure that is called when the button pressed event takes place. This procedure or module 604 presents components on the display, such as filed and software segments that permit the user to provide a summary of the code that is being changed, indicating why the screen share is being requested 606. The data that is entered is sent in the notification, for example as the 'Change Notification' message 502.

Figure 16:
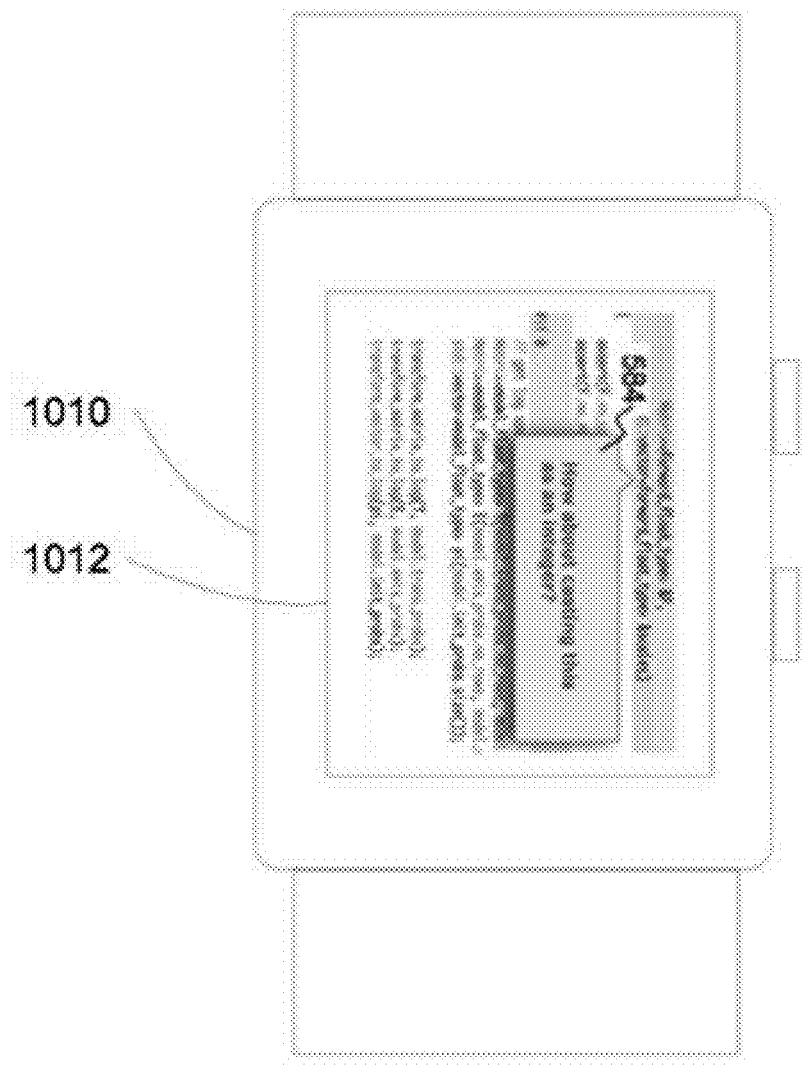
FIG. 16 illustrates a smart watch user interface according to an example embodiment of the present application.

FIG. 16 illustrates another example where notification and comments may be posted to a smart watch interface 1010. In this case the face of the watch would display the notification, a touch interface 1012 would permit a specific portion of the code to be tagged and a voice to text interpreter would post the comment to the pop-up comment window.

Figure 17:
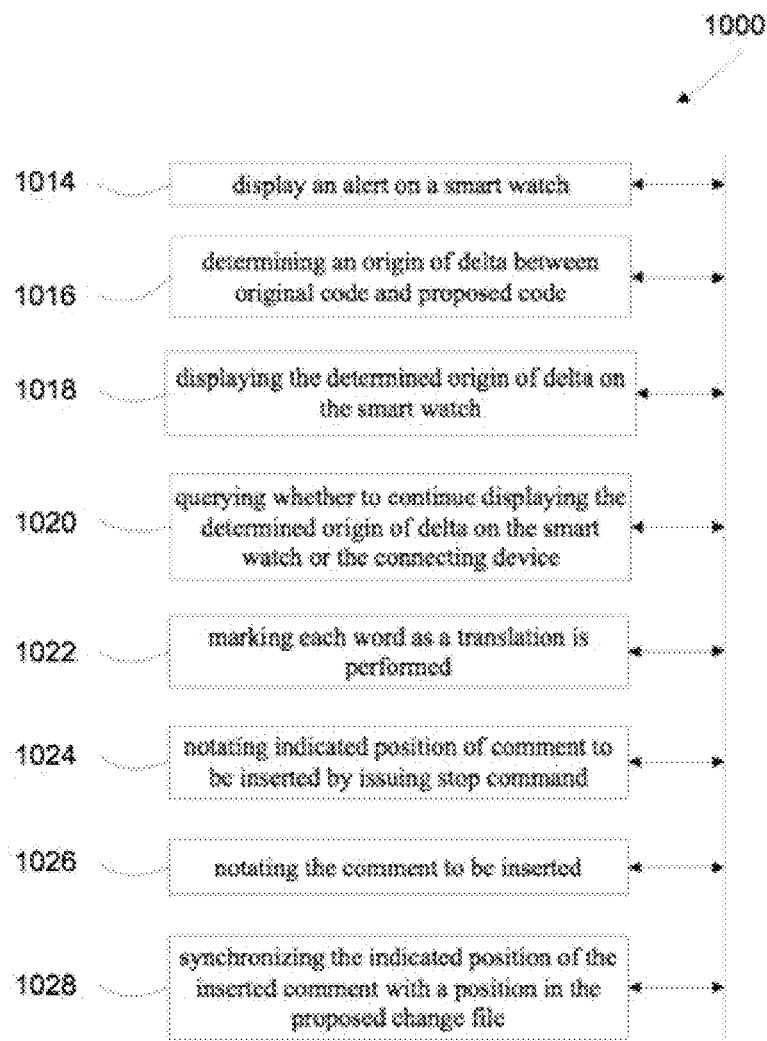
FIG. 17 illustrates a flow diagram of a smart watch operation according to an example embodiment of the present application.

FIG. 17 illustrates an example logic flow diagram for displaying an alert on a smart watch in which a possible change notification has been sent. Referring to FIG. 17, the alert is received and displayed on the watch interface 1014 and a scan of the original code and a scan of the updated code determines 1016 a beginning point of the proposed changes as a delta between the two code segments. This beginning point is indicated 1018 on the watch screen and a query 1020 made as to whether the change should be viewed on the smart watch or on the connected mobile device. If the change is elected for the smart watch a text to voice translation of the change is commenced in which each word of the proposed change is visually identified 1022 by either bolding, color change or underlining, or the like as the word is spoken. At any point in the translation the reviewer may stop the translation 1024 by verbally stating the word "stop" followed by the phrase "insert comment", 1026 at which point she would state her comment. This stated comment would be translated by the mobile device to text and inserted in a comment bubble at the point indicated by the spoken term "stop". The position indicated at the moment the word "stop" was spoken would be synchronized 1028 to the proposed change file and the inserted comment would be input into a comment bubble at that position in the file.

Figure 18:
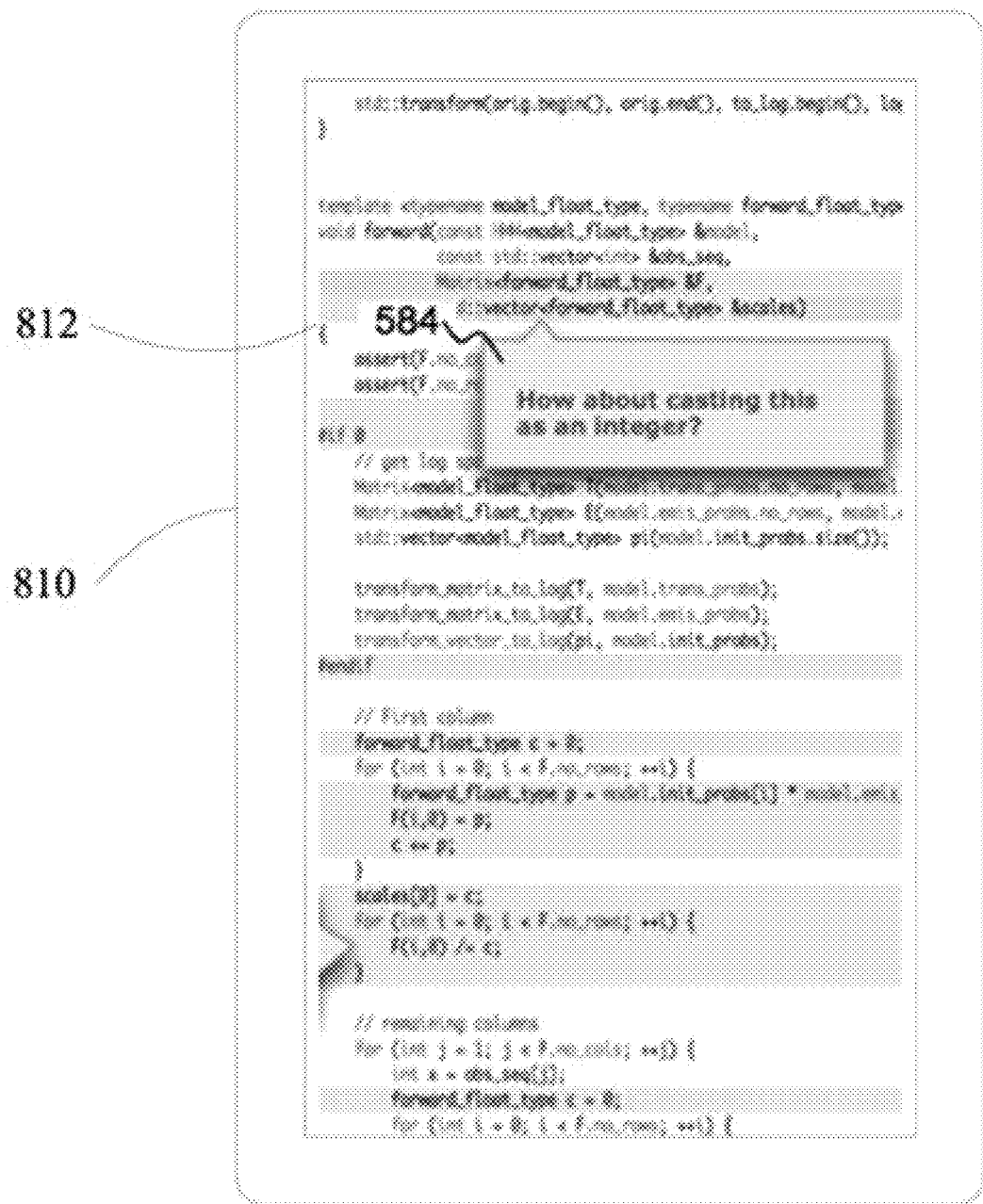
FIG. 18 illustrates a user interface of a computer tablet operation according to an example embodiment of the present application.

FIG. 18 illustrates yet another example where notification and comments may be posted to a smart phone user interface 810. In this case the display would show the notification, a touch interface 812 would permit a specific portion of the code to be tagged and either a text or voice to text interpreter would post the comment 584 to the pop-up comment window.

Figure 19:
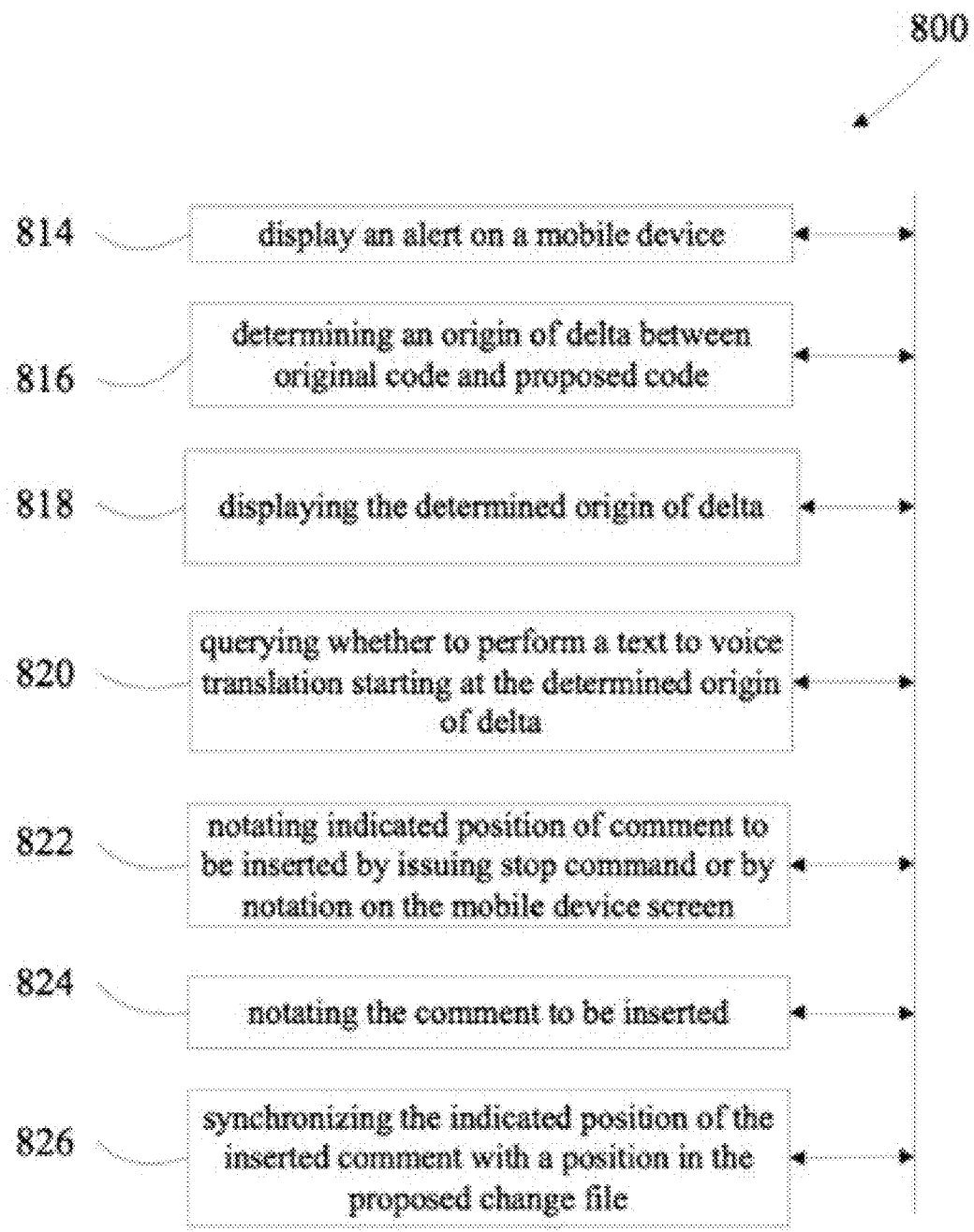
FIG. 19 illustrates a flow diagram of a computer tablet operation according to an example embodiment of the present application.

FIG. 19 illustrates another example logic flow diagram 800 where an alert is displayed 814 on a mobile phone in which a possible change notification has been received. A scan of the original code and a scan of the updated code may indicate a determined point of origin of the proposed changes 816. This determined origin point may be provided on the mobile device screen 818 and a query 820 is performed to determine whether a text to voice translation should be performed. If a text to voice translation of the change is selected, each word of the proposed change is visually identified by either bolding, color change or underlining, or the like as the word is spoken. At any point in the translation the reviewer may stop the translation by verbally stating the word "stop" 822 followed by the phrase "insert comment" 824, or, the reviewer may point to the position on the mobile device screen, at which point he would either verbally state his comment or type it in. If the comment is verbally stated, this stated comment would be translated by the mobile device to text and inserted in a comment bubble at the point indicated by the spoken term "stop". Either position indicated at the moment the word "stop" was spoken or the position of indicated by the touch screen would be synchronized 826 to the proposed change file and the inserted comment would be input into a comment bubble at that position in the file.

Figure 20:
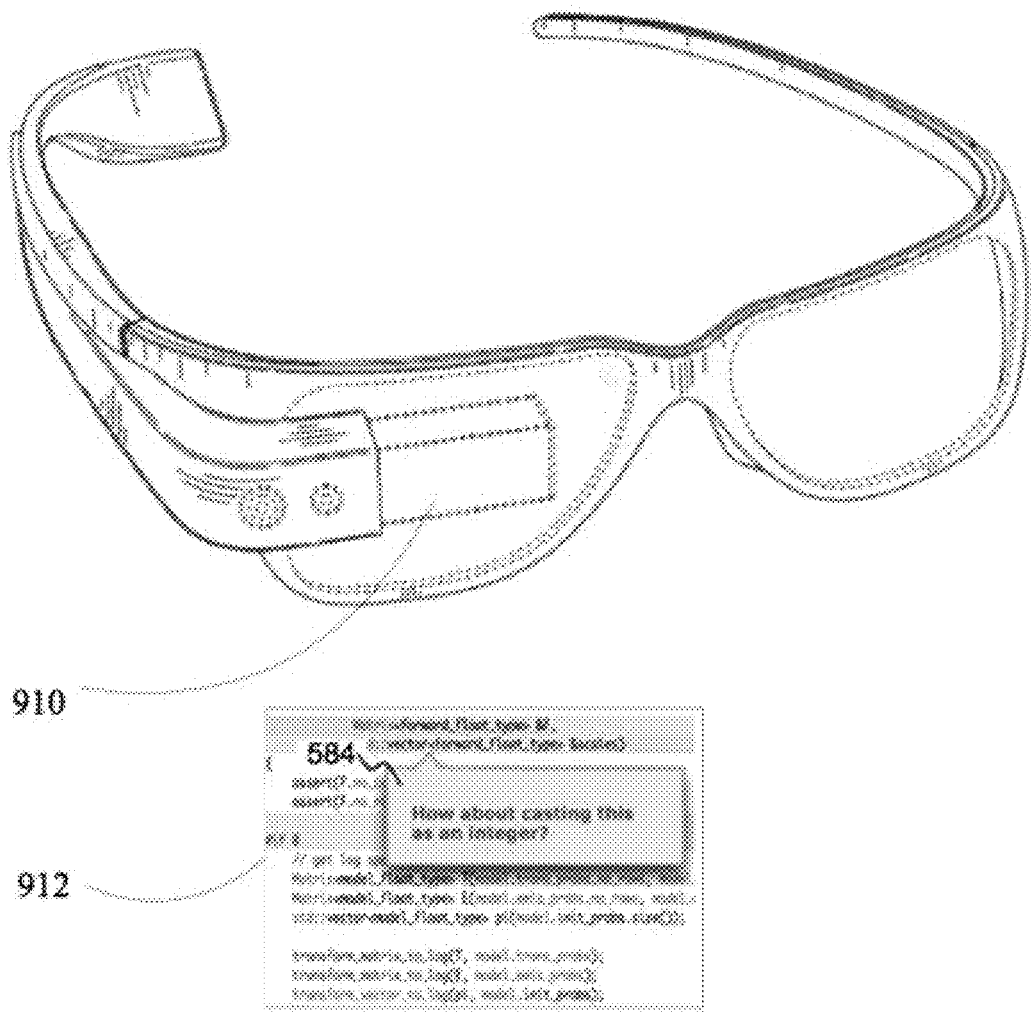
FIG. 20 illustrates an example interaction user interface of a smart glass device according to example embodiments.

FIG. 20 illustrates a further example where notification and comments may be posted to a smart glass 910 such as GOOGLE GLASS. In this case the optical module interface 912 of the glasses would display the notification and a microphone connected to a voice to text interpreter would post the comment 584 to the popup comment window.

Figure 21:
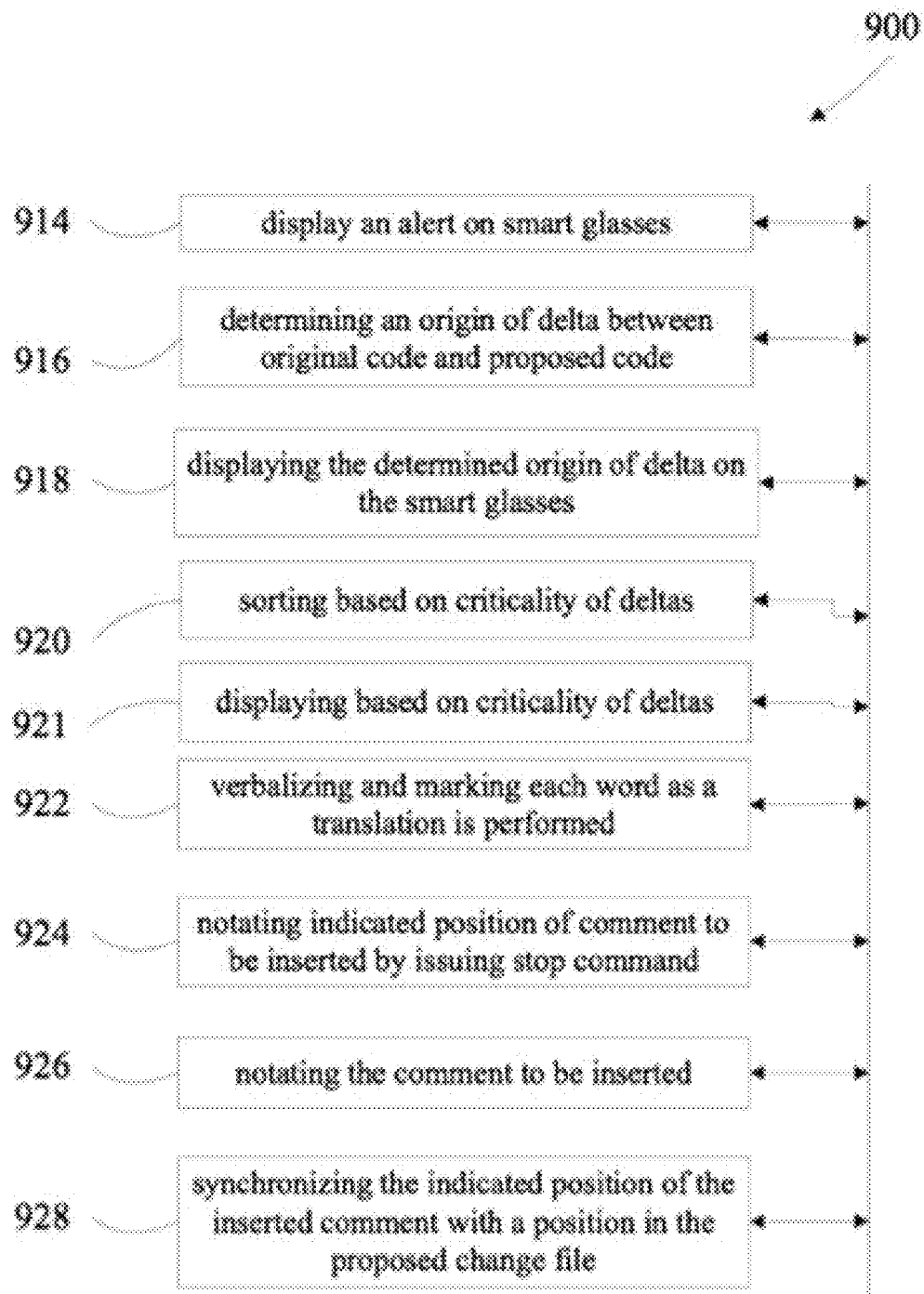
FIG. 21 illustrates a logic flow diagram of a smart glass device operation according to example embodiments.

FIG. 21 illustrates yet a further example flow diagram 900 that includes an alert that is displayed 914 on the smart glasses in which a possible change notification has been sent. A scan of the original code and a scan of the updated code indicates a determined origin 916 or a beginning point of the proposed changes. This beginning point is indicated 918 on the glasses and a sort operation 920 is made as to the criticality of the determined delta, and the most critical deltas are displayed 921. If the change is elected for the glasses, a text to voice translation of the change is commenced in which each word of the proposed change is verbalized and visually identified 922 by either bolding, color change or underlining, or the like as the word is spoken. At any point in the translation the reviewer may stop the translation by verbally stating the word "stop" 924 followed by the phrase "insert comment" 926, at which point she would state her comment. This stated comment would be translated by the mobile device to text and inserted in a comment bubble at the point indicated by the spoken term "stop". The position indicated at the moment the word "stop" was spoken would be synchronized 928 to the proposed change file and the inserted comment would be input into a comment bubble at that position in the file. The system permits each of the users involved in the proposed change to vote whether to accept the proposed code change. This functionality permits a method to gauge the acceptability of the proposed change. The system vote is accessible to the users. The voting may be accomplished through a component placed on the GUI so the user is able to input a positive or negative response to the proposed code modification. The voting component is placed in the screen share window and/or the 'Modified Code Notification' window.

Criticality of deltas may be determined by identifying whether underlying data structures are affected by a particular change. If a modification is proposed which would affect the layout of a data table then a detection of a data table layout change(s) would be deemed highly critical. Also, if a delta would affect how financials are calculated in some way, such as a change from how customers were charged in the past to how customers will be charged in the future, then the change would be deemed highly critical.

Figure 22:
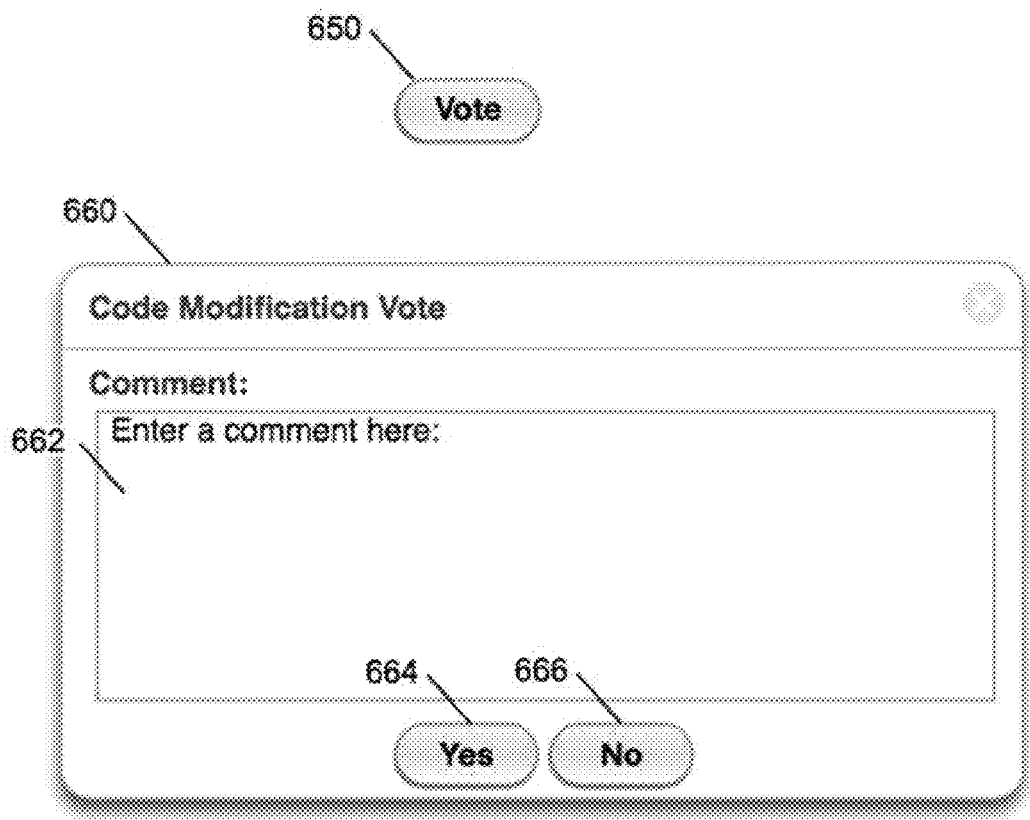
FIG. 22 illustrates an example voting user interface according to example embodiments.
Figure 23:
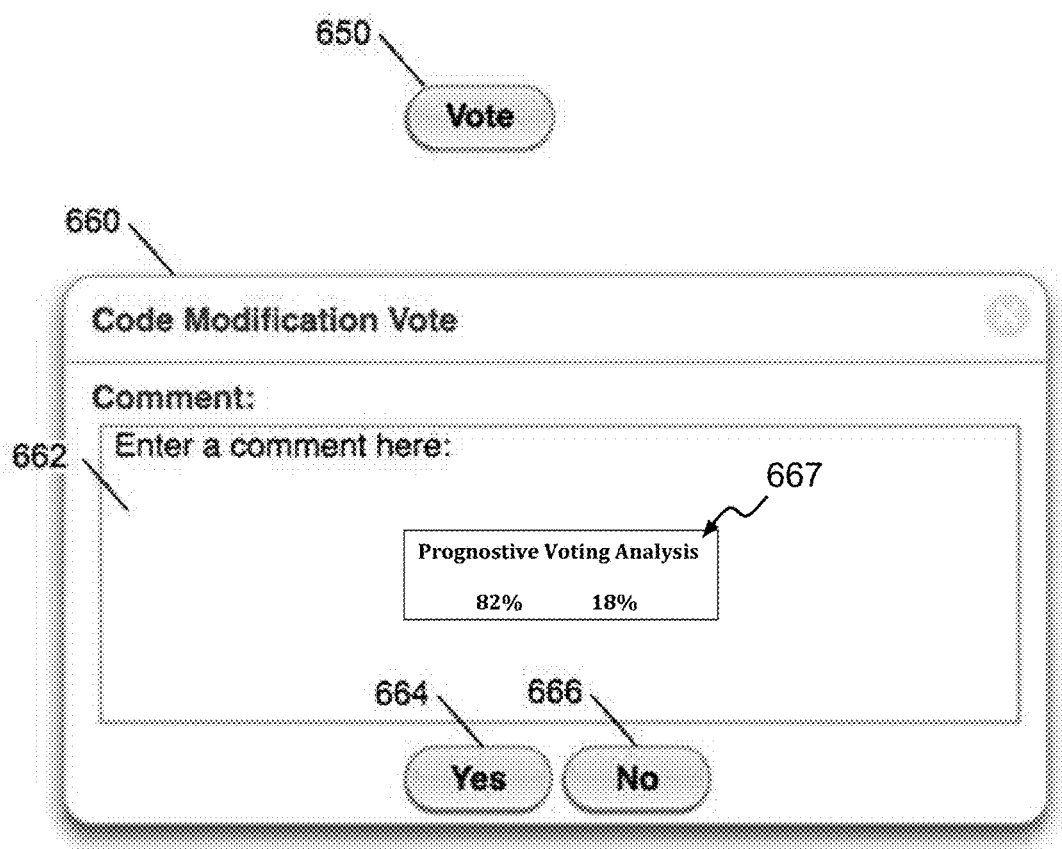
FIG. 23 illustrates another example voting user interface according to example embodiments.

FIG. 22 is one possible implementation of the voting user interface displayed on a user device 650/660. There is a "Vote" button 650 component placed in the GUI, permitting each recipient to vote on the approval of the proposed code modification. This button component is present in at least one of the screen share screen and the 'Code Modification Notification' display interfaces. Upon selecting the "Vote" button 650, a 'Code Modification Vote' window 660 is displayed on the display. The user may enter a comment in the comment component on the window to offer rationale for his or her vote. There are two buttons on the bottom of the window, a "Yes" button 664, and a "No" button 666. Upon pressing either button, the vote is submitted and the 'Code Modification Vote' window is removed from the display. The user may also dismiss the 'Code Modification Vote' window by selecting an "X" button located on the top, right area of the window wherein the window is removed from the display and no vote is submitted.

In another example, a voting deadline may be implemented with an announcement included in the notifications indicating a timeframe that it is acceptable to submit a vote. For example, voting is to be submitted within 24 hours. In another example, if the code is altered, a re-vote is sent so the recipients are able to cast a new vote on the altered code. In yet another example, the application may analyze the previous revision votes on a specific topic and assign a probability to the voting outcome. This prognostic analysis may be based on previous voting patterns, previous problem resolution patterns, previous reliance on similar resolutions and the like. In yet another example the vote would be applied if the percentage is greater than a predetermined level and the vote is not manually cast before the deadline is reached.

The application retains a vote in addition to the recipient(s). The application determines the acceptability of the code modification through processing that is further detailed below. It may be assumed that the most beneficial voting is received from the recipient(s) of the code sharing, yet it may also prove beneficial to receive a vote from the system itself. To determine the acceptability of the code modification, the application makes a determination according to the critical levels calculated in the above examples. As such, the received votes are added in the voting calculations along with the recipient(s) votes. The application may consider the similarity of the current proposed solution to previous solutions that were conducted, segmentation of the solution which contains similar snippets to previous solutions, intermediary solutions which act as an additional coupling between the application and the problem code and solution inversion in which the proposed solution changes either the input or output modules associated with the problem code.

Figure 24:
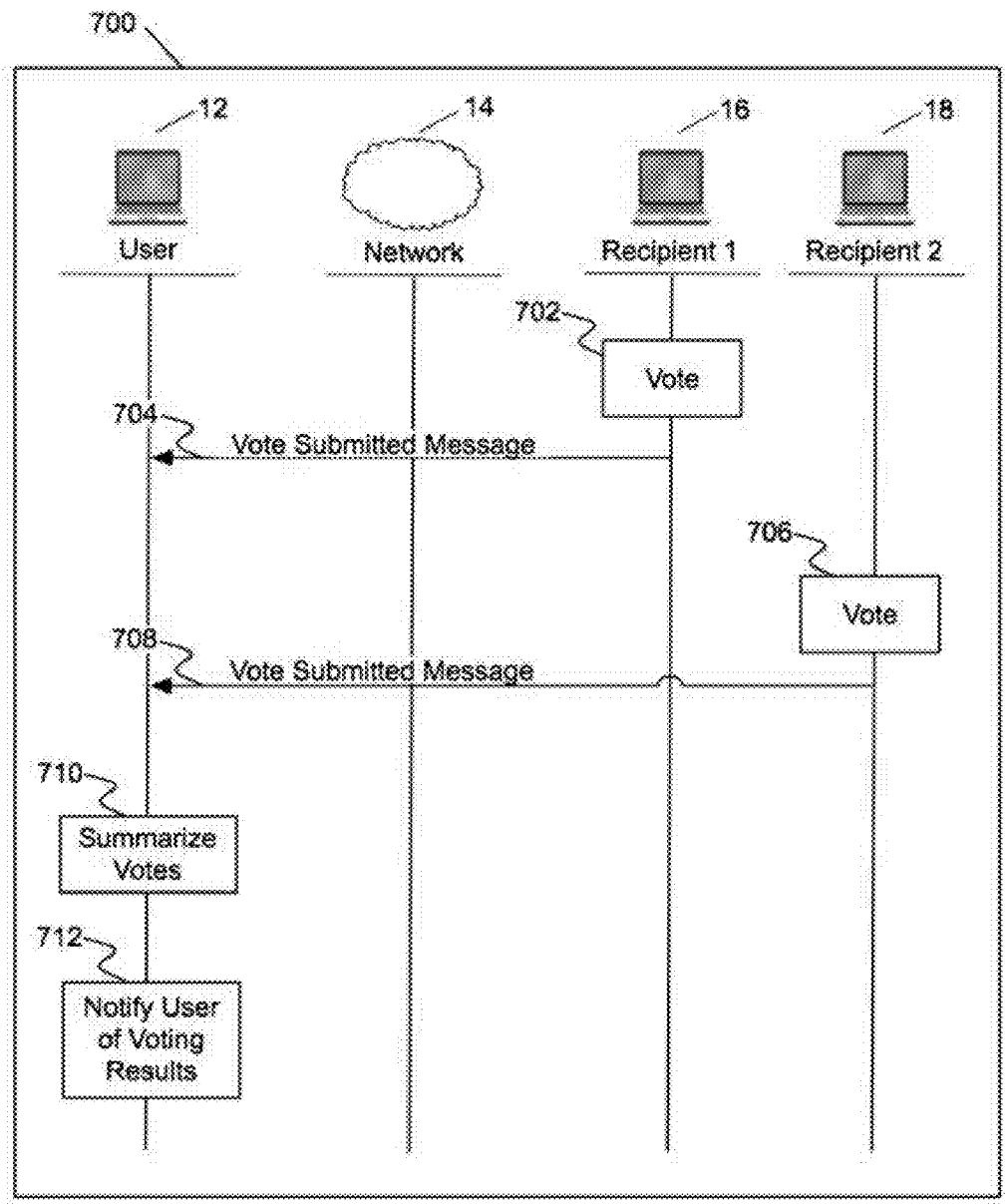
FIG. 24 illustrates a system diagram of a message flow voting configuration according to example embodiments.

The application summarizes the votes and notifies the user of the results of the voting. Any comments that were input by the recipient(s) are included in the voting results. FIG. 24 is a system configuration chart 700 of one possible implementation of the current application processing the voting of two recipients. The recipient-1 16 casts a vote on the code modification 702 so a 'Vote Submitted Message' 704 is sent to the user 12. The Recipient-2 18 also casts a vote on the code modification 706 where a 'Vote Modification Message' 708 is sent to the user. The 'Vote Modification Messages' are sent through the network 14 and routed to the user 12. The data contained in the 'Vote Submitted Message' is stored in the application's local data 12.

In another example, a remote system receives the 'Vote Submitted Message(s)' and the remote system may be a network element located in the network 14, or a separate component containing a processor and a memory where communication between the remote system and the recipient(s) is through the network 14. The application executing on the user's device 12 also communicates with the remote system through the network 14 to obtain the voting results. The application queries the remote system via a message sent to the remote system through the network and a resulting message is sent in response to the query back to the application. The user may view the current voting of the recipient(s) and the application summarizes the votes 710 and displays the results of the voting 712 to the user in a 'Voting Results Notification' window on a user interface.

Figure 25:
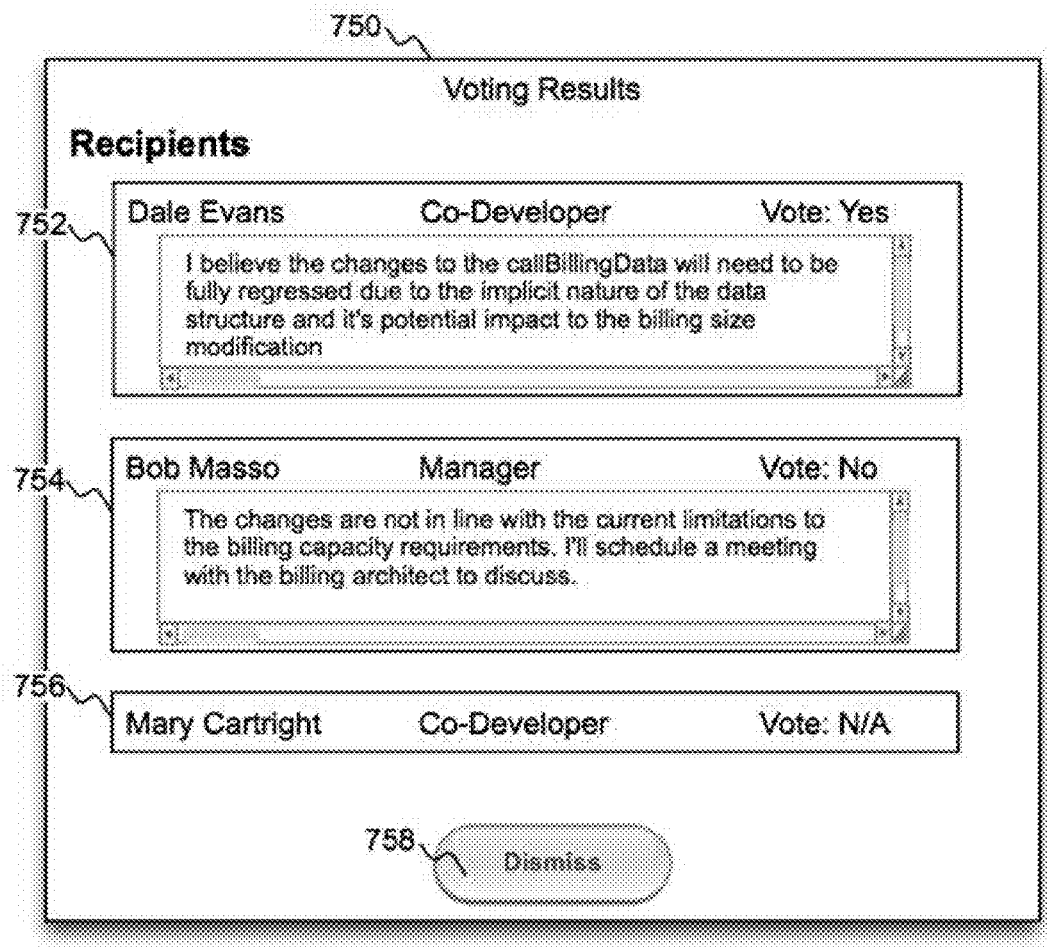
FIG. 25 illustrates a user interface of a voting results summary according to example embodiments.
Figure 26:
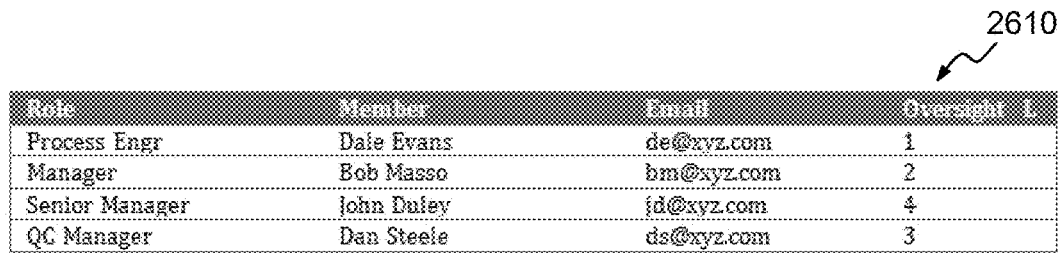
FIG. 26 illustrates a table of personnel to user mapping according to example embodiments.

FIG. 25 is one implementation of the application illustrating a GUI window of the voting results 750. Each of the recipient(s) are listed in separate components on the window

752, 754, 756, etc. A recipient is listed even though that recipient has not responded to the voting, as indicated in 756. In the first portion 752, the name of the recipient is shown, followed by the recipient's job function or title. Finally, the vote is shown as reflecting the vote that was cast by the recipient. Also included may be the data entered into the comment area by the recipient. Here, the recipient may explain his or her voting rationale, as well as enter information or questions for the user. The recipient may also utilize this area to provide justification to the vote that was cast. The first two recipients 752 and 754 have voted 'Yes' and 'No' respectively, and the final recipient, 756 has not yet voted. The user has the ability to dismiss the 'Voting Results' window by using a 'Dismiss' button component 758 on the window so the window can be removed from the display.

In another example, there is a "View Voting" button on the GUI of the application where the user is able to press the button and the application obtains the received votes that have been stored in the user's device 12. The application may send the results of the vote to a business entity that is determined to make a decision about moving forward. The rationale of each of the votes is included if available. The application may permit actions that include an organization's most appropriate personnel to be involved in consequential decisions by providing them a window for input into those decisions.

FIG. 16 illustrates a table 2610 that shows an example of the mapping of the personnel related to the user of the current application along with their names and email addresses. This information may be obtained from the organization's resource data and compiled per-project or assignment. Depending upon the role and current position of the member, a level is assigned to that individual to guide subsequent communication and input authorization determinations. Information may also be included for additional interaction with the personnel, such as phone numbers, cell numbers, geographic location of their work location, etc. The column entitled "Oversight Level" indicates a notification level based on position within the organization the management impact of the proposed change and the visibility to customers of a proposed change. In another example, the feedback weight of a person who is a level 5 is considered more important than the feedback weight of a person who is a level 1. In calculating the votes of the recipients the feedback weight is utilized.

Figure 27:
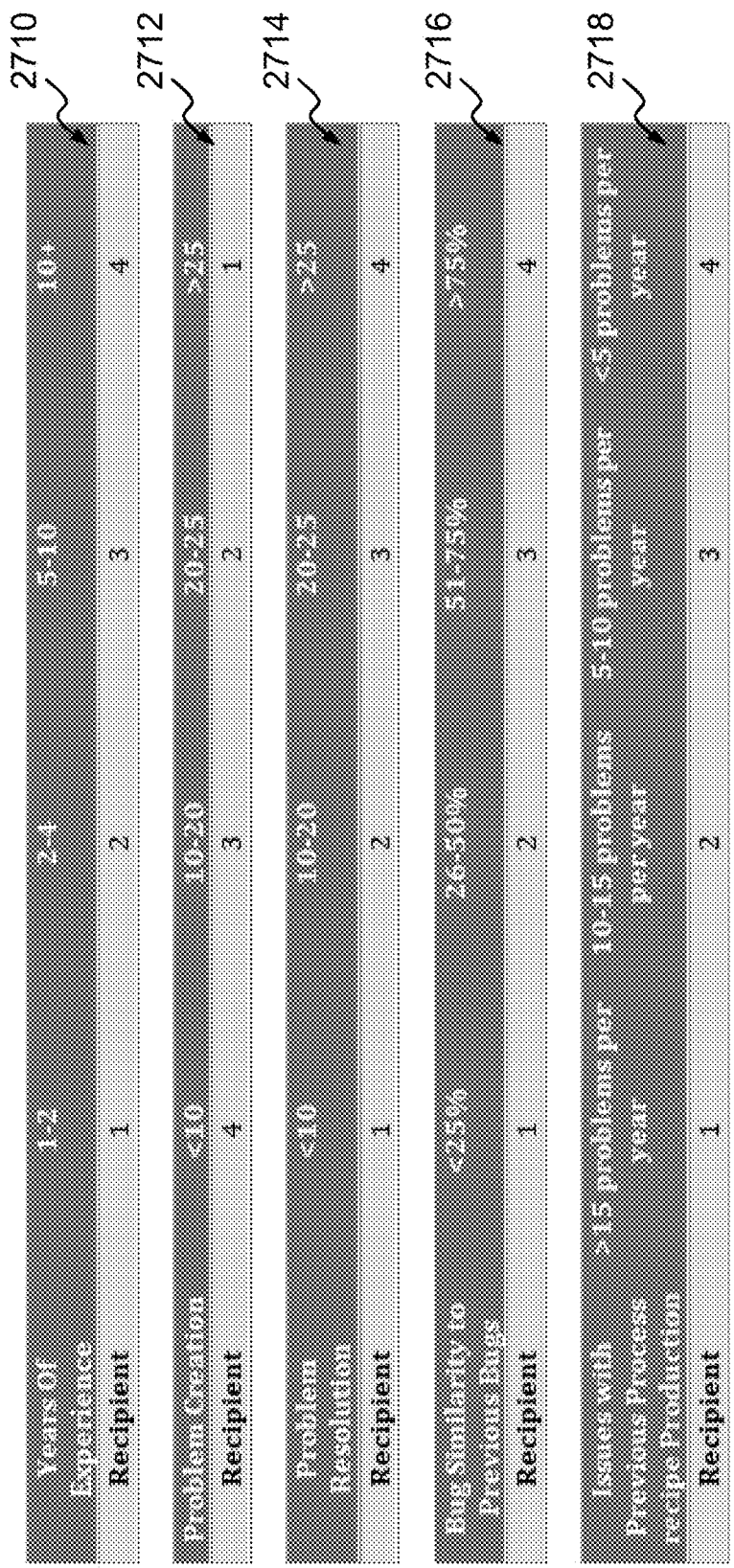
FIG. 27 illustrates a table of personnel experience according to example embodiments.

FIG. 27 illustrates an example of the mapping of the level of the recipient and the associated weight applied when calculating the voting results of that recipient. In another embodiment, the application determines the primary process engineers for a specific log-point. This is obtained by interfacing with the project data, for example data in project managing application. These primary process engineers are informed of alterations to a process recipe. The "process recipe" refers to a product along with the process utilized to create the product. For example, in software development, the product is the delivered code. The process recipe is the process utilized to develop, code, test the software prior to delivery. As a hardware example, the product is the IC board. The process recipe is the allocation of the individual parts and the joining of the parts to create the IC board. As process recipes are modified, the criticality of the change is determined and the software of the current invention may automatically notify other interested peers as to the change in the process recipe thus allowing a higher level of quality as more people are made aware of the change.

In another example, the level assigned to the person is not based solely on his/her position in the organization, but on other factors. One of these factors may be the process area affected by the process recipe change. Other factors that may be considered are experience 2710, previous problem creation 2712, previous success in problem resolution 2714, problem similarity to previously solved issues 2716, previous instances in problem prevention 2718.

Figure 28:
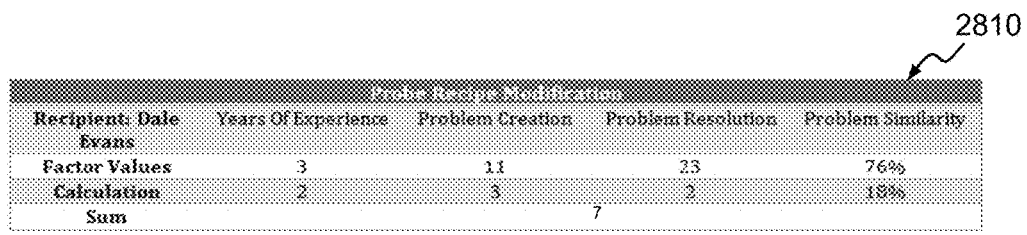
FIG. 28 illustrates a problem summary table according to example embodiments.

Each of the above instances helps the software determine the level of the recipient and is based on the software module of the process recipe under determination. An example perfect score of 16 indicates that the person is ascertained to be listed among the most expert process engineers for that process area. To determine the factor of the recipient, for example, the following calculation may be used with reference to FIG. 28 which includes a table 2810 where a user Dale has a rating of 7. If he had a rating of 10, in this process area, he would be considered an expert. Using factors such as these, it is possible to quantify and compare the critique and voting of the recipients. The application either automatically or manually initiates a share with at least one other user that may be a peer, a manager, project manager, or any other entity that may be interested or impacted by the proposed change. The juncture at which the sharing of the data is performed may be determined either by the software or manually initiated by the user. Sharing the proposed change may be initiated when a threshold impact level is reached in which others would be interested in or impacted by a proposed change.

The automatic initiation of sharing is determined by metrics that are either static in nature meaning that the metrics are hard-process recipes loaded into the software, or dynamically determined by the user in a configuration portion of the software. These metrics may include such elements as minor or major process changes, process criticality to internal qualifications, and process criticality to external qualifications.

Figure 29:
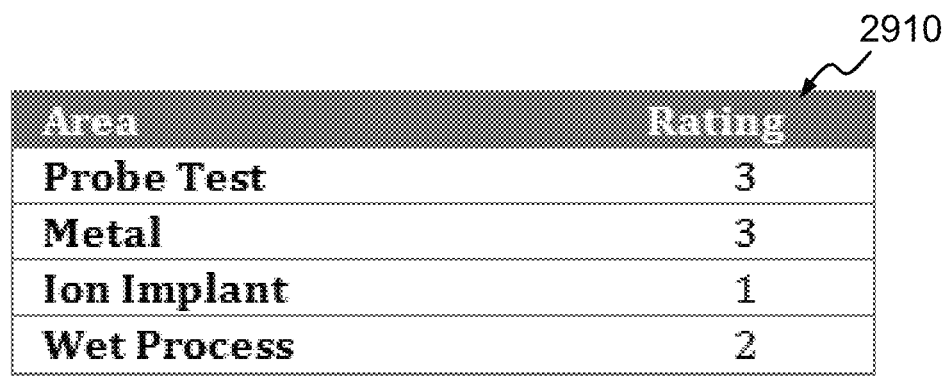
FIG. 29 illustrates a test rating table according to example embodiments.

FIG. 29 illustrates a ranking of development areas for a recipe update 2910. There are various means to categorize process changes and this categorization may reflect the level of qualification that would be impacted. Table 2910 illustrates an example of the process areas in which the user may be altering. The column entitled "Rating" indicates areas of importance from business interaction perspective, which may be impacted by the proposed change. As such, areas that are altered with a higher rating would indicate that changes to recipes in that particular area are more financially critical and thus need to be verified in greater detail by personnel before the proposed change is accepted.

Figure 30:
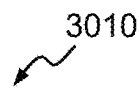
FIG. 30 illustrates a modification rating table according to example embodiments.

Ranking a type of process modification is necessary to understand the nature of the change to the process. Modifications of comments only do not need further review, but modifications to recipes affecting qualifications may be deemed critical. FIG. 30 illustrates a table 3010 that illustrates an example of the types of process recipe modifications made by the user and the respective ranking of the types of changes. The column entitled "Ranking" indicates the rank of the area such that a higher rank indicates greater importance, and a lower rank indicates lesser importance. As such, modifications reflecting a higher rank may indicate that those modifications that are more critical and would warrant additional review.

The ranking of process modules is determined primarily by whether the process module affects adding something to or removing something from the product. Another factor is whether the process module affects the state of the product for the next step in processing, such as a surface state of the material, whether water beads on the surface, the texture, electronegativity, dangling bonds, etc., or an end user care-about. A process module is a subset of instructions that instructs a machine how to process an item, it may be something as simple as washing a part, pre-heating the part, or something as complex as deposition and/or surface removal. The process module is a block of instructions that informs a piece of process machinery what to do next. In one example, the fabrication of printed circuit boards (PCBs) may include considerations regarding the temperature ramp rate while curing the boards would be a much lower criticality portion (minor qual) of the process module than the final temperature reached. The final temperature and time (major quals) would be a higher criticality process module since they would affect the cure amount which would affect subsequent drill operations, board breakdown parameters, line to line filaments, etc. The minor qual would be for an item that has no or little effect on the customer use of the PCB, the major qual would be for the process modules that affect customer concerns. Initially at least, the determination of ranking would be based on past experience of engineers for specific process modules. Once those process modules are identified, follow ranking would utilize the prior learning as a starting point.

The software compares the modified process recipe with the criticality entered into the 'Ranking Data Structures' window and records the associated level to the process recipe modification. Ranking Procedures/Modules for a recipe update ranking of modules and procedures may be utilized to determine the need for peer review prior to submission of the proposed change(s). This ranking may be placed within the process recipe so each of the process modules within the process recipe is documented to reflect the "rank" of the procedure/module. A proposed change to a process module with a lower ranking would be considered a less critical change and a ranking with a higher level may be considered a more critical change that would require review prior to submission.

For example, the rank of each process module may be included in the documentation of the process recipe, otherwise known as technical documentation. Technical documentation is documentation embedded in source process recipe. Often, tools may be used to auto-generate the process recipe documents by extracting the comments and software contracts, where available, from the source process recipe and creating reference manuals in such forms as text or HTML files. As the rank of each of the procedures/modules is included in the comments, the current application is able to ascertain the rank of the edited process recipe by accessing the rank of the edited process recipe in the auto-generated reference manual of the process recipe.

A timetable of a proposed process recipe change to a release may also be a factor in determining the need for a review. For example, if the process recipe change is at the beginning of the process design cycle, there exists less of a need for a review of the change. If the change is made when the product is close to being released, then a greater need exists to have a process recipe reviewed. As the time of the proposed change moves closer to the release date, the current application determines the amount of time until delivery and uses this as an additional item in determining whether a review of the process recipe is required.

Figure 31:
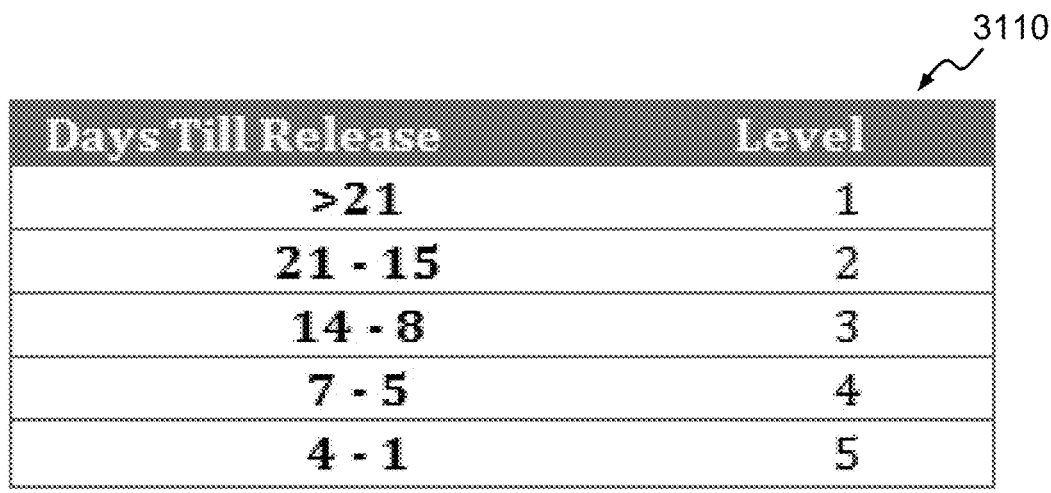
FIG. 31 illustrates a release data level ranking table according to example embodiments.

FIG. 31 illustrates a possible implementation of the current application providing a possible mapping of the number of days until product release with respective levels for each of the time periods. As the product release date nears, all modifications to the process recipe become more critical, and thus require more scrutiny. The current application takes into account the number of days until the release of the software in determining the need of the process recipe to be reviewed.

Screen sharing may be occasioned by at least one of: sending a notification including the changes made to the process module(s), sending a notification to recipient(s) indicating a desire to share a screen to review modifications, and initiating a screen share with recipient(s). The first example of sharing may include the sending of the process recipe differences between two files so one file contains the altered process recipe and the second file contains the original process recipe. These changes are then sent to the recipient(s) devices so a 'Modified Process Recipe Notification' window is displayed on the recipient(s)' devices.

An alternative procedure for sharing code changes and similar code instances includes the sending of a notification to the recipient(s) such that the notification indicates the desire for the originator of the process recipe modification to establish a screen sharing activity with the recipient(s). The recipient(s) may accept or deny the screen-share request via interacting with components on the GUI of the notification window. The sharing may include the direct sharing of the user's screen with the recipient(s). The screen data is delivered to the recipient(s) such that the recipients may accept or deny the request. One possible implementation of the current application is to determine the nature of the changed process recipe, and determine the recipients of a pending notification. A first check may be made to determine the type of process recipe modification. Some of the possible types of modifications are an alteration to the comments in the process recipe, such as a non-qual alteration and a qual-affecting alteration. The various levels pertaining to the change may be determined and paired with the changes as part of the notification. If many types of changes are being made, then the highest level of change of the various levels may be utilized in the determination as the governing level at which compliance is required.

If the level is above level-1, then a notification may be necessary and processing continues to further determine the critical level of the process recipe modification. The type of change may be determined by understanding the area of the process recipe that is being modified, the process module that is being modified, and the current time until a scheduled software release date. These calculations arrive at a singular "critical level" in each of the determinations. The highest critical level is used as the critical level of the process recipe modification.

In another example, at least one critical level is made to be a higher priority, thus when calculating the single critical level, more weight is placed on the level(s) that has the higher priority. The recipients are determined and are sent the notification(s) of the process recipe modification. In determining the recipient(s), the software uses the critical level that has been calculated. For example, if the critical level is a 4, all of the recipients that are at a level-4 and below are notified of the process recipe modification.

In another example, at least one critical level is made to be a higher priority, thus when determining the recipient(s) of the notification, more weight is placed on the level(s) that has the higher priority. The notification(s) is/are sent to the determined recipient(s). One possible implementation of a notification may include a change to a process recipe that is presented to recipient(s). The notification presents changes made to the process recipe, which permits the user to interact further with the user of the change. The user initiating the change may be displayed at the top of the notification window, which permits the recipient(s) to know who is proposing the process recipe change. The process recipe difference may be displayed in the notification window. The process recipe difference may be determined by products that are widely available that compare two versions of a file. The window permits the reader to determine that the process recipe has changed through altering the background of the process recipe. Furthermore, the reader may be able to scroll through the file by at least one scroll bar, permitting the reader to navigate up/down as well as left/right. The name and location of the process recipe in the changed file may be located at the top of the process recipe portion of the notification permitting the reader to determine the file and hierarchy of the proposed change. The reader(s) may be able to view and understand the proposed change, then buttons are presented at the bottom of the notification to permit the reader to further act on the proposed process recipe change.

A "Screen Share" button may permit the reader to initiate a process that sends a notification to the user wherein the user is able to share a screen with the reader(s) permitting further interaction. A "Comment" button permits a separate window to be displayed (further depicted herein) wherein the user may be able to traverse through the process recipe modifications and provide comments to the user such that the comments are aligned with the process recipe modification. A "Dismiss" button dismisses the notification window removing the notification window from the display without taking any further action.

In another embodiment, the difference in the original process recipe and the modified process recipe is shown in the 'Modified Process recipe Notification With Comments' window along with the area to enter comments. This permits the reader to view the entire process recipe modifications and enter comments. In another example, a screen sharing may occur automatically when the system determines that a file alteration warrants the review by another person. In such a scenario, the application automatically sends a notification to recipient(s) of a change that is in need of review. The software sends automatically sends notifications according to at least one of the following elements: 1) process stability is affected by the change, 2) process targeting is affected by the change, 3) minor quals are affected by the change, and 4) major quals are affected by the change. Also, the user has the option to initiate the screen sharing via a component on the display of the device. A component is displayed on the GUI such as a button entitled "Screen Share". When the button is pressed, the functionality that sends a notification to a recipient(s) is executed. Additional functionality may be included when the user presses the button. The functionality may be added to a procedure that is called when the button pressed event takes place. This procedure or module presents components on the display that permits the user to provide a summary of the process recipe that is being changed, indicating why the screen share is being requested. The data that is entered is sent in the notification, for example the 'Change Notification' message. The application permits each of the users involved in the proposed change to vote whether to accept the proposed process recipe change. This functionality permits a method to gauge the acceptability of the proposed change.

Minor quals may be identified for changes which include minor changes to materials, processes or designs which do not affect performance, fit or finish of manufactured goods. The changes do not affect the product sent to the customer and thus, the customer may not be informed of such a minor qual type change. Major quals are for changes which include major changes to materials, processes and/or designs which will affect at least one of the performance, fit or finish of the produced goods. The customer will be able to detect that a change has occurred and will be informed in such an example. Major quals typically require characterization and reliability tests to insure that the updated product has at least the same performance as the product before the change. Typically, qual levels are specified on a 1-3 level with 1 being a minor qual, 3 being major qual, and 2 affecting only cosmetic changes which the customer may observer but which is not affecting actual product performance.

The application vote procedure is accessible to the users. The voting may be accomplished through a component placed on the GUI wherein the user is able to input a positive or negative response to the proposed process recipe modification. The voting component is placed in the screen share window and/or the 'Modified Process recipe Notification" window. One possible implementation of the voting components includes a "Vote" button component placed in the GUI permitting each recipient to vote on the approval of the proposed process recipe modification. This button component is present in at least one of the screen share screen and the 'Process recipe Modification Notification' display.

Upon pressing the "Vote" button, a 'Process Recipe Modification Vote' window is displayed on the display. The user may enter a comment in the comment component on the window to offer rationale for his or her vote. There exist two buttons on the bottom of the window, a "Yes" button, and a "No" button. Upon pressing either button, the vote is submitted and the Process recipe 'Modification Vote' window is removed from the display. The user may also dismiss the 'Process recipe Modification Vote' window by pressing an "X" button located on the top, right area of the window wherein the window is removed from the display and no vote is submitted. A voting deadline may be implemented with an announcement included in the notifications indicating a timeframe wherein it is acceptable to submit a vote. For example, voting is to be submitted within 24 hours. Additionally, if the process recipe is altered, a re-vote is sent so the recipients are able to cast a new vote on the altered process recipe. The application summarizes the votes and notifies the user of the results of the voting. Any comments that were input by the recipient(s) are included in the voting results. The user may view the current voting of the recipient(s) and the system summarizes the votes and displays the results of the voting to the user in a 'Voting Results Notification' window.

Figure 32:
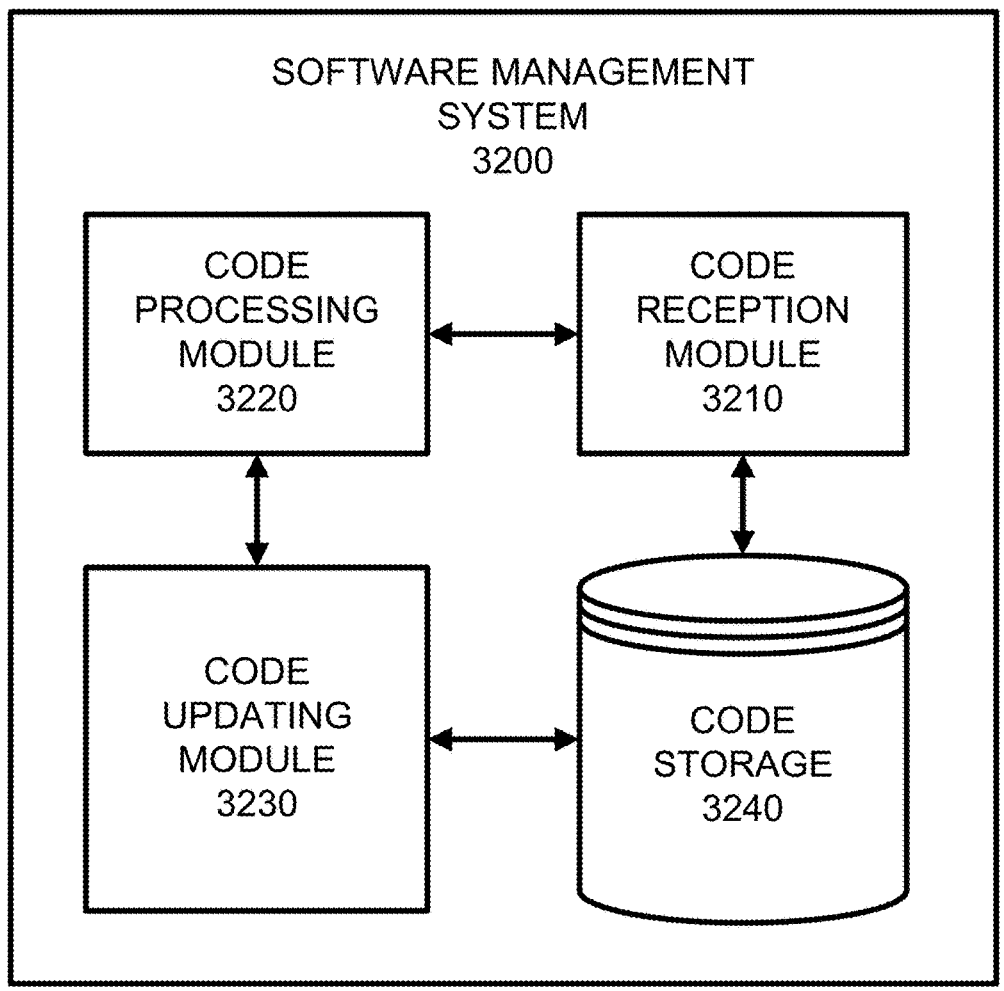
FIG. 32 illustrates a system configuration configured to perform one or more of the example embodiments of the present application.

FIG. 32 illustrates a software management system 3200 according to example embodiments. Referring to FIG. 32, the system 3200 may represent a standalone computer, a group of computers on a network, in the cloud or in communication via any medium known to one skilled in the art which operate to perform the various operations, procedures, methods and related functions of the present application and the software application described throughout the disclosure. Referring to FIG. 32, the code reception module 3210 may be a transmitter/receiver that receives updates to the code and stores the code in memory 3240 and forwards the code for processing 3220. The updated code may be identified and stored in memory via the code update module 3230.

In one specific method of operation, the system may perform processing software code stored in a first file of the memory 3240 and identifying a plurality of bugs in the software code via the processing module 3220. The processing module may then perform creating a second file including the software code and inserting identifiers at locations in the software code identifying the plurality of bugs, creating a plurality of notifications identifying the second file and the identifiers, and transmitting the notifications to a plurality of user devices associated with the software code development. The plurality of bugs may be compiler execution errors.

The system may also perform identifying each of the bugs as having a corresponding problem rating and identifying a plurality of user profiles which match the problem rating and which are suitable to correct such problems, and transmitting the notification to the plurality of user devices corresponding to the plurality of user profiles which match the problem rating. Also, the plurality of user profiles which match the problem rating level will have a threshold oversight level required to correct the plurality of bugs meaning they are qualified to correct such problems. The system may then perform receiving confirmations from the plurality of user devices regarding the plurality of bugs and determining that the confirmations are received from user profiles having a threshold oversight level which matches or exceed the problem rating level. Thereafter the changes to the code can be updated and finalized in a saved file based on the confirmations received from the user profiles. Additionally, the first file can be overwritten with the second file comprising the finalized changes to the code. Also, the system may perform identifying a deadline for the software code to be completed, determining an amount of time until the deadline, and pairing the software bugs with an oversight level based on the amount of time until the deadline.

The system 3200 may also perform a method that includes receiving a modification to software code stored in a first file, identifying an oversight level of a user profile associated with a user device that performed the modification to the software code, creating a second file including the software code modification and an identifier identifying the modification, creating a plurality of notifications identifying the second file and the software code modification, and transmitting the notifications to a plurality of user devices having an oversight level that is greater than or equal to the oversight level of the user profile.

The system 3200 may perform receiving a plurality of feedback parameters from the plurality of user devices via the reception module 3210, weighting the plurality of feedback parameters based on a plurality of weights assigned to the plurality of user devices and corresponding user profiles via the processing module 3220 and finalizing changes to the code based on the weighted feedback parameters. The plurality of feedback parameters may include a plurality of votes to make specified changes to the code. The plurality of votes may include a confirmation or a rejection of a proposed change to the code. The method may also include weighting the plurality of votes, tallying (adding) the plurality of weighted votes, and comparing the tallied plurality of votes to a decision threshold value and determining whether to apply the proposed changes based on the tallied plurality of votes. The decision threshold value is a predetermined majority percentage of the total votes. Thereafter, the system may perform ranking a plurality of process modules of a recipe procedure, and modifying the recipe procedure based on the rank of the process modules.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 33 illustrates an example network element 3300, which may represent any of the above-described network components, etc.

Figure 33:
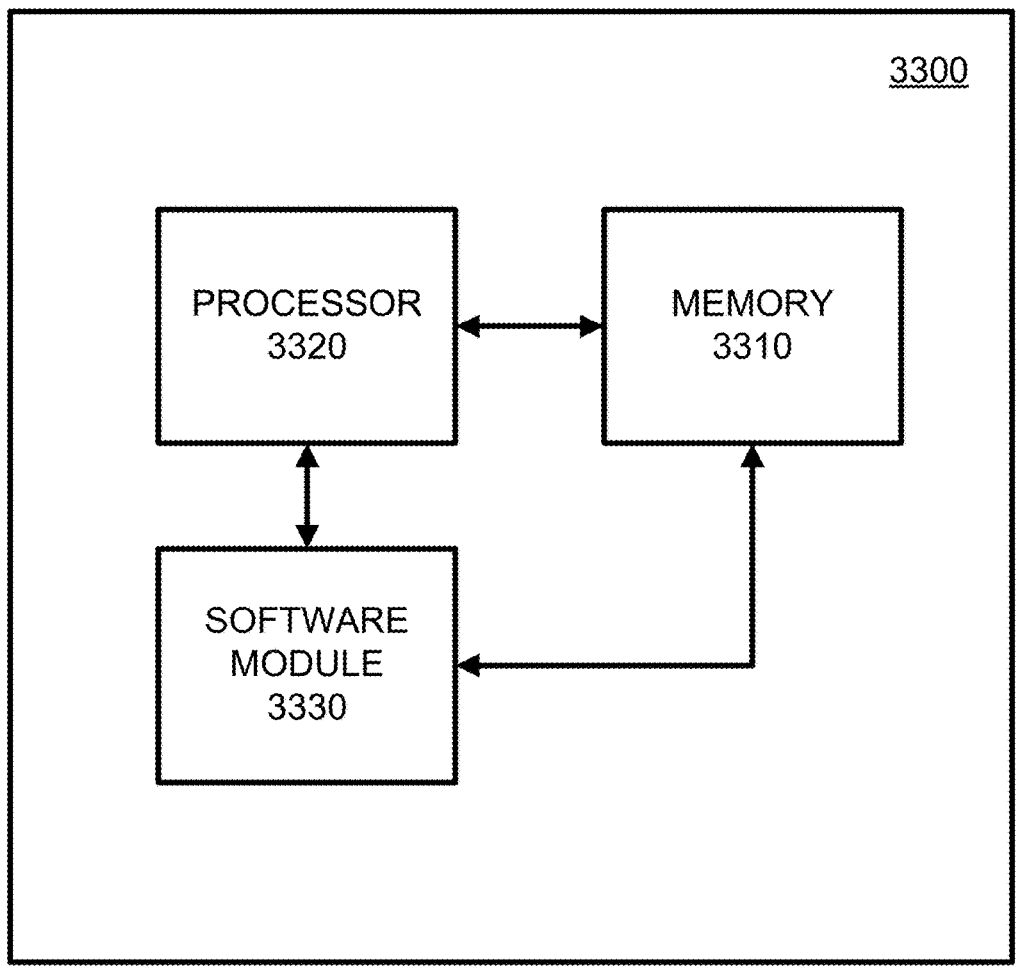
FIG. 33 illustrates an example network entity device configured to store instructions, software, and corresponding hardware for executing the same, according to example embodiments of the present application.

As illustrated in FIG. 33, a memory 3310 and a processor 3320 may be discrete components of the network entity 3300 that are used to execute an application or set of operations. The application may be coded in software in a computer language understood by the processor 3320, and stored in a computer readable medium, such as, the memory 3310. The computer readable medium may be a non-transitory computer readable medium that includes tangible hardware components in addition to software stored in memory. Furthermore, a software module 3330 may be another discrete entity that is part of the network entity 3300, and which contains software instructions that may be executed by the processor 3320. In addition to the above noted components of the network entity 3300, the network entity 3300 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of FIG. 32 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   receiving, by a computer, a modification to software code stored in a first file;
   determining an oversight level of a plurality of user profiles using weighted personnel specific factors, the weighted personnel specific factors comprising at least one of a number of years of experience, a number of bugs created, a number of bugs solved, a number of lines of code submitted, an indication of issues with previous code production, and an indication of solution conciseness in lines of code;
   identifying, by the computer, an oversight level of at least one user profile of the plurality of user profiles, the at least one user profile of the plurality of user profiles associated with a user device that performed the modification to the software code;
   creating, by the computer, a second file comprising the modification to the software code and an identifier identifying the modification;
   creating, by the computer, a plurality of notifications identifying the second file and the modification to the software code;
   transmitting, by the computer, the notifications to a plurality of user devices having an oversight level that is greater than or equal to the oversight level of the at least one user profile of the plurality of user profiles,
   receiving, by the computer, a plurality of feedback parameters from the plurality of user devices, the plurality of feedback parameters comprising a plurality of votes including a confirmation or rejection of a proposed change to the software code from the modification to the software code;
   generating, by the computer, a plurality of weighted feedback parameters by weighting the plurality of feedback parameters based on a plurality of weights assigned to the plurality of user devices and corresponding user profiles;
   tallying, by the computer, the plurality of weighted feedback parameters, thereby generating a tallied plurality of feedback parameters; and
   comparing, by the computer, the tallied plurality of feedback parameters to a decision threshold value and determining, by the computer, whether to apply the proposed change to the software code based on the tallied plurality of feedback parameters; and
   finalizing modifications, by the computer, to the software code based on the weighted feedback parameters.

2. The method of claim 1, wherein the decision threshold value is a predetermined majority percentage of the tallied plurality of feedback parameters.

3. The method of claim 1, further comprising:
   ranking, by the computer, a plurality of process modules of a recipe procedure; and
   modifying, by the computer, the recipe procedure based on the rank of the process modules.

4. An apparatus comprising:
   a receiver;
   a transmitter;
   a processor; and
   memory comprising a set of instructions that, when executed, cause the processor to:
   identify an oversight level of a user profile associated with a user device that performed a modification to software code stored in a first file received by the receiver;
   determine an oversight level of a plurality of user profiles using personnel specific factors, the personnel specific factors comprising at least one of a number of years of experience, a number of bugs created, a number of bugs solved, a number of lines of code submitted, an indication of issues with previous code production, and an indication of solution conciseness in lines of code;

create a second file comprising the modification to the software code and an identifier to identify the modification;

create a plurality of notifications to identify the second file and the modification to the software code; and transmit, by the transmitter, the notifications to a plurality of user devices having an oversight level that is greater than or equal to the oversight level of the user profile;

weight a plurality of feedback parameters received by the receiver from the plurality of user devices, based on weighted feedback parameters generated by assigning a plurality of weights to the plurality of user devices and corresponding user profiles, the plurality of feedback parameters comprising a plurality of votes including a confirmation or a rejection of specified modifications to the software code from the modification to the software code;

tally, by the processor, the plurality of weighted feedback parameters, thereby generating a tallied plurality of feedback parameters; and compare, by the processor, the tallied plurality of feedback parameters to a decision threshold value and determining, by the processor, whether to apply the modification to the software code based on the tallied plurality of feedback parameters; and finalize the specified modifications to the software code based on the weighted plurality of feedback parameters.

5. The apparatus of claim 4, wherein the decision threshold value is a predetermined majority percentage of the tallied plurality of feedback parameters.

6. The apparatus of claim 4, wherein the processor is further configured to assign a rank to a plurality of process modules of a recipe procedure, and modify the recipe procedure based on the rank of the process modules.

7. A non-transitory computer readable medium configured to store instructions that when executed causes a processor to:

receive a modification to software code stored in a first file;

identify an oversight level of a user profile associated with a user device that performed the modification to the software code;

determine an oversight level of a plurality of user profiles by using personnel specific factors, the personnel specific factors comprising at least one of a number of years of experience, a number of bugs created, a number of bugs solved, a number of lines of code submitted, an indication of issues with previous code production, and an indication of solution conciseness in lines of code;

create a second file comprising the modification to the software code and an identifier identifying the modification;

create a plurality of notifications identifying the second file and the modification to the software code;

transmit the notifications to a plurality of user devices having an oversight level that is greater than or equal to the oversight level of the user profile;

receive a plurality of feedback parameters comprising a plurality of votes to make specified from the plurality of user devices including a confirmation or a rejection of a proposed change to the software code from the modification to the software code;

generate weighted feedback parameters by weighting the plurality of feedback parameters based on a plurality of weights assigned to the plurality of user devices and corresponding user profiles;

tally the plurality of weighted feedback parameters, thereby generating a tallied plurality of feedback parameters; and compare the tallied plurality of feedback parameters to a decision threshold value and determine whether to apply the proposed change to the software code based on the tallied plurality of feedback parameters; and finalize modifications to the software code based on the weighted feedback parameters.

8. The non-transitory computer readable medium of claim 7, wherein the decision threshold value is a predetermined majority percentage of the tallied plurality of feedback parameters and wherein the processor is further configured to:

rank a plurality of process modules of a recipe procedure; and modify the recipe procedure based on the rank of the process modules.

* * * * *